United States Patent
Heo et al.

(10) Patent No.: US 12,490,049 B2
(45) Date of Patent: Dec. 2, 2025

(54) ELECTRONIC DEVICE FOR CONFIRMING POSITION OF EXTERNAL ELECTRONIC DEVICE, AND OPERATION METHOD THEREFOR

(71) Applicant: Samsung Electronics Co., Ltd., Suwon-si (KR)

(72) Inventors: Jeongyoon Heo, Suwon-si (KR); Sangwon Gil, Suwon-si (KR); Donguk Kim, Suwon-si (KR); Minkyu Song, Suwon-si (KR); Woojin Park, Suwon-si (KR); Choonghoon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 479 days.

(21) Appl. No.: 17/983,003

(22) Filed: Nov. 8, 2022

(65) Prior Publication Data
US 2023/0058663 A1  Feb. 23, 2023

Related U.S. Application Data

(63) Continuation of application No. PCT/KR2021/004221, filed on Apr. 5, 2021.

(30) Foreign Application Priority Data

May 8, 2020 (KR) .................. 10-2020-0055145
Sep. 21, 2020 (KR) .................. 10-2020-0121722

(51) Int. Cl.
*H04W 4/02* (2018.01)
*G01S 1/08* (2006.01)
(Continued)

(52) U.S. Cl.
CPC ............. *H04W 4/023* (2013.01); *G01S 1/08* (2013.01); *G01S 11/06* (2013.01); *H04W 64/003* (2013.01)

(58) Field of Classification Search
CPC . H04W 64/003; H04W 64/006; H04W 4/023; H04W 4/026–027; G01S 11/02;
(Continued)

(56) References Cited

U.S. PATENT DOCUMENTS 9,842,254 B1 * 12/2017 Brailovskiy ............ G06T 7/246
10,032,353 B2 * 7/2018 Baczuk .................. H04W 4/70
(Continued)

FOREIGN PATENT DOCUMENTS

JP      2010-244497 A    10/2010
JP      2011-159320 A    8/2011
(Continued)

OTHER PUBLICATIONS

Chinese Office Action dated Jan. 26, 2025, issued in a Chinese Patent Application No. 202180033996.4.
(Continued)

Primary Examiner — Cassi J Galt
(74) Attorney, Agent, or Firm — Jefferson IP Law, LLP

(57) ABSTRACT

An electronic device is provided. The electronic device includes a display, a communication circuit, a sensor, and a processor, wherein the processor is configured to identify, through the communication circuit, data packet information associated with an external electronic device, identify a first external electronic device from among the external electronic device based on the data packet information, obtain a predicted frame (P-frame) pattern during a first time period and a P-frame or received signal strength indication (RSSI) pattern during a second time period based on information associated with the packet size of the first external electronic
(Continued)

device in the data packet information, identify a motion vector during the second time period through the based sensor, and provide position information about the first external electronic device based on the P-frame or RSSI pattern during the second time period and the motion vector during the second time period.

18 Claims, 23 Drawing Sheets

(51) Int. Cl.
*G01S 11/06* (2006.01)
*H04W 64/00* (2009.01)

(58) Field of Classification Search
CPC ... G01S 11/06; G01S 1/02; G01S 1/08; G01S 1/68
See application file for complete search history.

(56) References Cited

U.S. PATENT DOCUMENTS

| | | | | |
|---|---|---|---|---|
| 11,550,022 | B2* | 1/2023 | Brede | G01S 5/0273 |
| 12,052,794 | B2* | 7/2024 | Han | H04L 63/1475 |
| 12,175,745 | B2* | 12/2024 | Andrews | G06N 3/08 |
| 2010/0056207 | A1 | 3/2010 | Yang | |
| 2010/0112954 | A1* | 5/2010 | Son | H04K 3/822 |
| | | | | 455/67.7 |
| 2011/0267951 | A1* | 11/2011 | Stanwood | H04L 47/2408 |
| | | | | 370/235 |
| 2017/0026798 | A1 | 1/2017 | Prevatt | |
| 2017/0207865 | A1 | 7/2017 | Critchfield | |
| 2019/0158982 | A1 | 5/2019 | Farnham | |
| 2019/0242989 | A1 | 8/2019 | Lee et al. | |

FOREIGN PATENT DOCUMENTS

| | | |
|---|---|---|
| JP | 2015-197353 A | 11/2015 |
| KR | 10-2005-0078595 A | 8/2005 |
| KR | 10-2006-0014623 A | 2/2006 |
| KR | 10-2008-0043211 A | 5/2008 |
| KR | 10-2012-0132086 A | 12/2012 |
| KR | 10-2019-0094954 A | 8/2019 |
| KR | 10-2067046 B1 | 1/2020 |
| WO | 2006/090936 A1 | 8/2006 |
| WO | 2019-222947 A1 | 11/2019 |

OTHER PUBLICATIONS

Extended European Search Report dated Aug. 21, 2023, issued in European Patent Application No. 21800184.0.
Singh et al., I Always Feel Like Somebody's Sensing Me! A Framework to Detect, Identify, and Localize Clandestine Wireless Sensors. XP 081669916, May 6, 2020.
Cheng et al., DeWiCam: Detecting Hidden Wireless Cameras via Smartphones. XP 055934901, May 29, 2018.
Cheng et al., On Detecting Hidden Wireless Cameras: A Traffic Pattern-based Approach. XP 011776381. IEEE Transactions on Mobile Computing. vol. 19, No. 4, Apr. 2020.
Jie Xiong et al., ArrayTrack: A fine-grained indoor location system, 10th USENIX Symposium on Networked Systems Design and Implementation (NSDI '13), Jan. 1, 2013.
Hua Xue et al., WiZoom: Accurate Multipath Profiling using Commodity WiFi Devices with Limited Bandwidth, IEEE Secon, Jan. 1, 2019.
Hajo Holzmann et al., A likelihood ratio test for bimodality in two-component mixtures—with application to regional income distribution in the EU, Universitat Gottingen, Jan. 1, 2008.
Korean Office Action dated Jul. 21, 2025, issued in Korean Patent Application No. 10-2020-0121722.
Chinese Office Action dated Aug. 1, 2025, issued in Chinese Patent Application No. 202180033996.4.

* cited by examiner

ELECTRONIC DEVICE FOR CONFIRMING POSITION OF EXTERNAL ELECTRONIC DEVICE, AND OPERATION METHOD THEREFOR

CROSS-REFERENCE TO RELATED APPLICATION(S)

This application is a continuation application, claiming priority under § 365(c), of an International application No. PCT/KR2021/004221, filed on Apr. 5, 2021, which is based on and claims the benefit of a Korean patent application number 10-2020-0055145, filed on May 8, 2020, in the Korean Intellectual Property Office, and of a Korean patent application number 10-2020-0121722, filed on Sep. 21, 2020, in the Korean Intellectual Property Office, the disclosure of each of which is incorporated by reference herein in its entirety.

BACKGROUND

1. Field

The disclosure relates to an electronic device for identifying the position of an external electronic device and an operation method thereof. More particularly, the disclosure relates to an electronic device capable of identifying the position of a hidden camera, which captures the user, as well as the presence of the hidden camera and an operation method thereof.

2. Description of Related Art

Recently, devices (e.g., cameras) capable of capturing images have been downsized. The image captured by the camera may be leaked to the outside in real-time through wireless communication. Misuse of downsized and high-performance cameras as hidden cameras is raised as a social issue. However, downsized and high-performance hidden cameras are difficult to detect.

Accordingly, there is increasing interest in devices and applications for detecting hidden cameras and their positions.

The above information is presented as background information only to assist with an understanding of the disclosure. No determination has been made, and no assertion is made, as to whether any of the above might be applicable as prior art with regard to the disclosure.

SUMMARY

A user may find hidden cameras using a hidden camera detector. However, the user needs to possess and carry such a device to detect hidden cameras.

Hidden camera detectors of the related art using radio signals suffer from high detection errors due to interference caused by the radio signals from other devices and terrain conditions. An alternative type of devices using camera lens reflection light or electromagnetic waves generated from the camera may be used when recognizing the approximate position of the camera.

Aspects of the disclosure are to address at least the above-mentioned problems and/or disadvantages and to provide at least the advantages described below. Accordingly, an aspect of the disclosure is to provide an electronic device capable of identifying the position of a hidden camera, which captures the user, as well as the presence of the hidden camera and an operation method thereof.

Additional aspects will be set forth in part in the description which follows and, in part, will be apparent from the description, or may be learned by practice of the presented embodiments.

In accordance with an aspect of the disclosure, an electronic device is provided. The electronic device includes a display, a communication circuit, at least one sensor, and at least one processor. The at least one processor may be configured to identify data packet information associated with at least one external electronic device, through the communication circuit, identify a first external electronic device among the at least one external electronic device, based on the data packet information, obtain a predicted frame (P-frame) pattern during a first time period and a P-frame or received signal strength indication (RSSI) pattern during a second time period, based on information associated with a packet size of the first external electronic device among the data packet information, identify a motion vector during the second time period through the at least one sensor, and provide location information about the first external electronic device, based on the P-frame or RSSI pattern during the second time period and the motion vector during the second time period.

In accordance with another aspect of the disclosure, a method for operating an electronic device is provided. The method includes identifying data packet information associated with at least one external electronic device, identifying a first external electronic device among the at least one external electronic device, based on the data packet information, obtaining a P-frame pattern during a first time period and a P-frame or RSSI pattern during a second time period, based on information associated with a packet size of the first external electronic device among the data packet information, identifying a motion vector during the second time period, and providing location information about the first external electronic device, based on the P-frame or RSSI pattern during the second time period and the motion vector during the second time period.

Various embodiments of the disclosure, there may be provided an electronic device capable of identifying the position of a hidden camera as well as the presence of the hidden camera and an operation method thereof.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
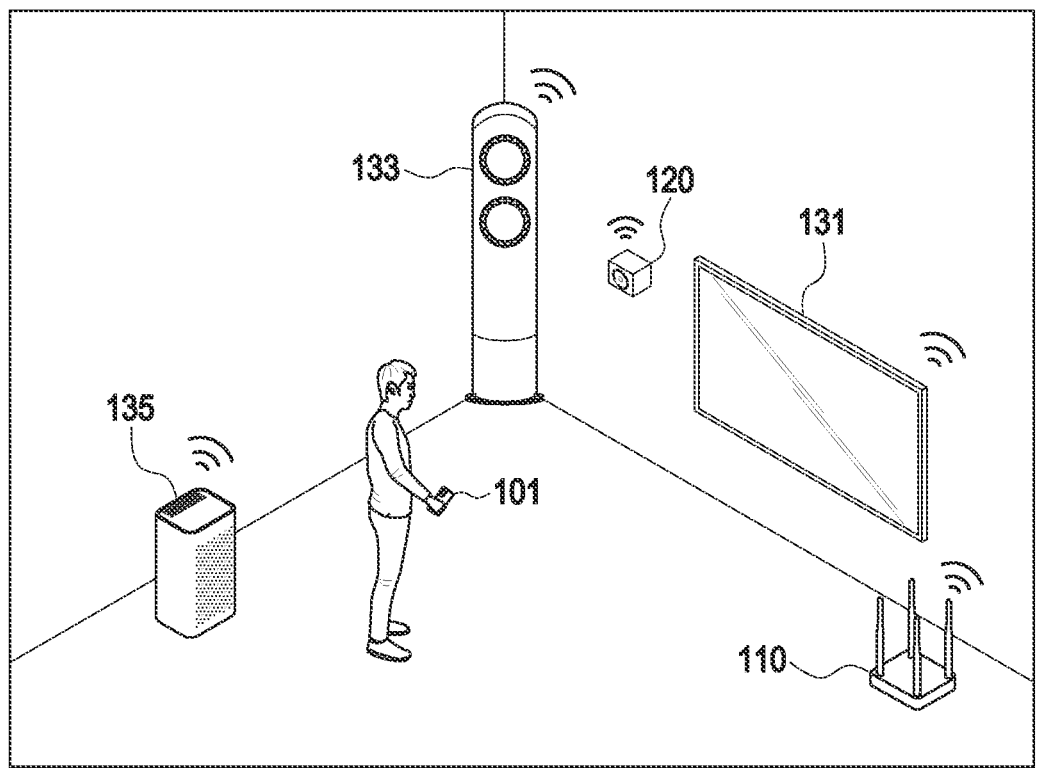
FIG. 1 illustrates a system for identifying an external electronic device according to an embodiment of the disclosure.

FIG. 1 illustrates a system for identifying an external electronic device according to an embodiment of the disclosure.

Referring to FIG. 1, according to an embodiment of the disclosure, a system 10 for identifying an external electronic device may include an electronic device 101, a wireless router 110, a first external electronic device 120, a second external electronic device 131, a third external electronic device 133, and a fourth external electronic device 135. Meanwhile, the system 10 for identifying an external electronic device may include a plurality of wireless routers. The wireless router 110 may be a Wi-Fi access point (AP) or a fifth generation (5G) fixed wireless access (FWA). The first external electronic device 120, the second external electronic device 131, the third external electronic device 133, and the fourth external electronic device 135 are not limited as long as they are electronic devices that perform communication through the wireless router 110, and the number of the external electronic devices is not limited.

According to an embodiment of the disclosure, the first external electronic device 120 may be a capture device and is capable of live streaming using the wireless router 110. The first external electronic device 120 may process (e.g., encode) the captured image to transmit successive image frames. The image frames may be one of an intra frame (I-frame), a predicted frame (P-frame), or a bidirectional frame (B-frame). The I-frame is a frame stored as it is, and may have the largest capacity among the I-frame, P-frame, and B-frame. For example, the I-frame may be divided into a plurality of packets according to the size and transmitted. The P-frame is a forward prediction frame, and may be a frame that predicts and stores only partial data that differs from the I-frame positioned immediately before. When capturing a static space, the portion different from the previous I-frame is small, so that the size of the P-frame may be small. In the case of capturing a space including motion, since there are many portions that are different from the previous I-frame, the size of the P-frame is large, and the larger the moving part on the screen, the larger the size of the P-frame may be. The B-frame may be a bidirectional prediction frame that predicts and stores motion between the I-frame and the P-frame, and between the I-frame and the P-frame.

According to an embodiment of the disclosure, the plurality of external electronic devices 120, 131, 133, and 135 may receive data packets from, or transmit data packets to, the wireless router.

According to an embodiment of the disclosure, the electronic device 101 may identify (or gather) the packets transmitted/received by at least some of the external electronic devices 120, 131, 133, and 135 to/from the wireless router 110. For example, the electronic device 101 may capture the packet. The captured packet may include identification information about the device (source) transmitting the packet, identification information about the device (destination) receiving the packet, and information about the size (or length) of the packet.

Figure 2:
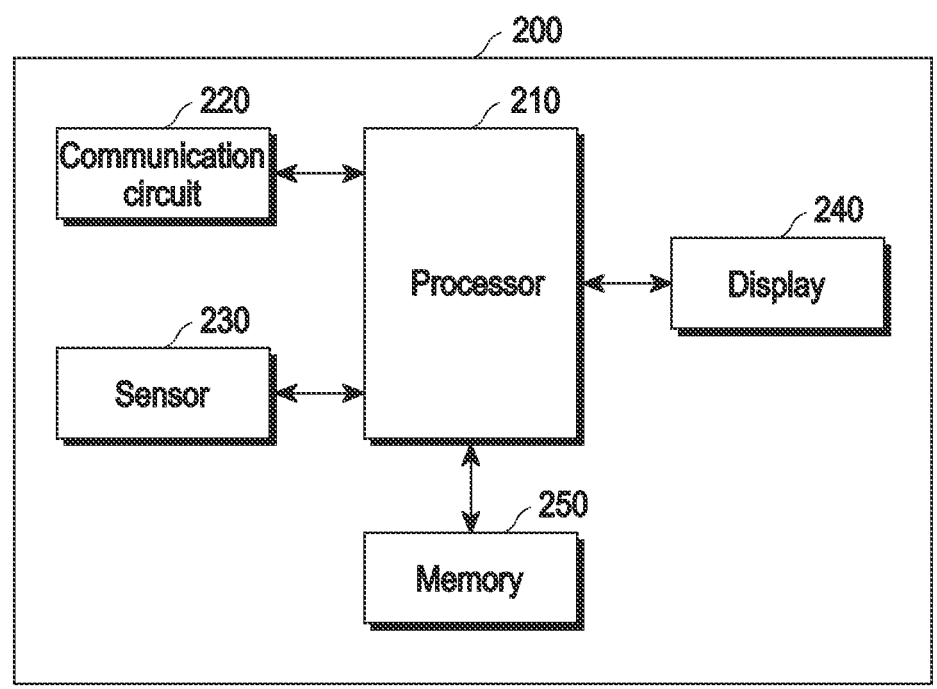
FIG. 2 is a block diagram schematically illustrating an electronic device according to an embodiment of the disclosure.

FIG. 2 is a block diagram schematically illustrating an electronic device according to an embodiment of the disclosure.

Referring to FIG. 2, according to an embodiment of the disclosure, an electronic device 200 (e.g., the electronic device 101 of FIG. 1) may include a processor 210, a communication circuit 220, a sensor 230, a display 240, and a memory 250. In some embodiments of the disclosure, some of the components may be implemented as single integrated circuitry. For example, the sensor 230 (e.g., a fingerprint sensor, an iris sensor, or an illuminance sensor) may be implemented as embedded in the display 240. According to an embodiment of the disclosure, at least some of the components of FIG. 2 may be implemented to be excluded from the electronic device 200.

According to an embodiment of the disclosure, the processor 210 may execute, for example, software (e.g., a program) to control at least one other component (e.g., a hardware or software component) of the electronic device 101 coupled with the processor 210, and may perform various data processing or computation. According to one embodiment of the disclosure, as at least part of the data processing or computation, the processor 210 may load a command or data obtained from another component (e.g., the sensor 230) in the memory 250, process the command or the data stored in the memory 250, and store resulting data in the memory 250. According to an embodiment of the disclosure, the processor 210 may include a main processor (e.g., a central processing unit (CPU) or an application processor (AP)), and an auxiliary processor (e.g., a graphics processing unit (GPU), an image signal processor (ISP), a sensor hub processor, or a communication processor (CP)) that is operable independently from, or in conjunction with, the main processor. Additionally or alternatively, the auxiliary processor may be adapted to consume less power than the main processor, or to be specific to a specified function. According to an embodiment of the disclosure, the auxiliary processor may be implemented as separate from, or as part of the main processor. The auxiliary processor may control at least some of functions or states related to at least one component (e.g., the display 240 or the camera (not shown)) of the electronic device 101, instead of the main processor while the main processor is in an inactive (e.g., sleep) state or along with the main processor while the main processor is an active state (e.g., executing an application). According to an embodiment of the disclosure, the auxiliary processor (e.g., an image signal processor) may be implemented as part of another component (e.g., the camera (not shown)) functionally related thereto.

The processor 210 according to an embodiment of the disclosure may identify data packet information about at least one external electronic device through the communication circuit 220. For example, identifying data packet information may mean capturing the packet transmitted/received between the wireless router and at least one external electronic device. For example, the packet may include a header and data. The header may not be encrypted. The packet header, not encrypted, may include identification information about the device (source) transmitting the packet, identification information about the device (destination) receiving the packet, and information about the size of the packet.

According to an embodiment of the disclosure, the processor 210 may identify the first external electronic device among at least one external electronic device based on data packet information. The processor 210 may identify identification information about the device transmitting the included packet and identification information about the destination receiving the packet based on the data packet information. When the identification information about the device transmitting the packet is external electronic device and/or the identification information about the device receiving the packet is identification information about the wireless router, it may mean uploading a file.

According to various embodiments of the disclosure, the processor 210 may identify whether the first external device is transmitting an image to the wireless router based on the data packet information. For example, when live streaming the image captured by the capture device, the ratio of uplink packets to downlink packets may be high. The processor 210 may identify that the external electronic device, where the ratio of uplink packets to all the packets exceeds a specific value, among at least one external electronic device is the first external electronic device (i.e., the capture device). When the first external device transmits images to the recipient directly without passing through the wireless router, the ratio of downlink packets to uplink packets may be high, and the processor 210 may identify that the external electronic device, where the ratio of downlink packets to all the packets exceeds a specific value, among the at least one external electronic device is the first external electronic device (i.e., the capture device).

As another embodiment of the disclosure, the processor 210 may identify whether the first external device (e.g., the capture device) live-streams the captured image based on the periodicity of the transmitted data packet pattern. For example, upon identifying that the first external electronic device successively transmits a preset number of, or more, maximum transmission units of packets periodically, based on the data packet information transmitted by the first external device, the processor 210 may identify that the image captured by the first external device is live-streamed. As another embodiment of the disclosure, the processor 210 may identify the type of the transmitted frame based on the data packet information transmitted by the first external device and, upon identifying that transmission of the I-frames which have a large data size is periodically performed, identify that the first external device live-streams the captured image. The operation of identifying the type of the transmitted frame based on the data packet information is described below with reference to FIGS. 3A and 3B.

According to an embodiment of the disclosure, the processor 210 may identify frames and the respective sizes of the frames based on the data packet information transmitted/received by the first external electronic device.

Figure 3A:
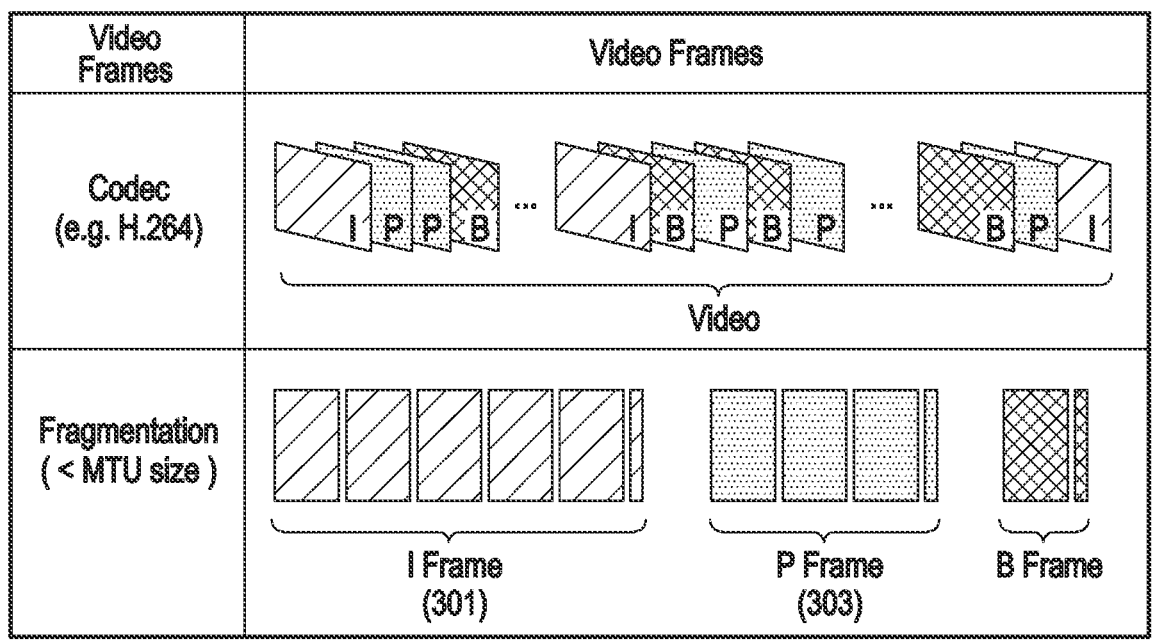
FIG. 3A is a view illustrating a size of a packet according to an embodiment of the disclosure.

FIG. 3A is a view illustrating a size of a packet according to an embodiment of the disclosure.

Referring to FIG. 3A, the frame may be split into a plurality of packets according to the size and be transmitted. According to an embodiment of the disclosure, when the first external electronic device transmits a captured image, the first external electronic device may successively the I-frame, the P-frame, and the B-frame. As shown in FIG. 3A, P-frames and B-frames may be disposed between an I-frame and another I-frame. According to the size of each frame, the I-frame 301 may be split into five maximum transmission unit (MTU) packets and a packet smaller in size than one MTU packet and be transmitted. The P-frame 303 may be split into three MTU packets and a packet smaller in size than one MTU packet and be transmitted. Here, the MTU packet may mean a packet having a transmission size of the maximum transmission unit. As described above, since the size of the I-frame may be larger than that of other frames, the number of MTU packets corresponding to the I-frame may be larger than the number of MTU packets corresponding to other frames. Meanwhile, the sizes of I-frame, P-frame, and B-frame may be changed depending on the transmitted image.

Figure 3B:
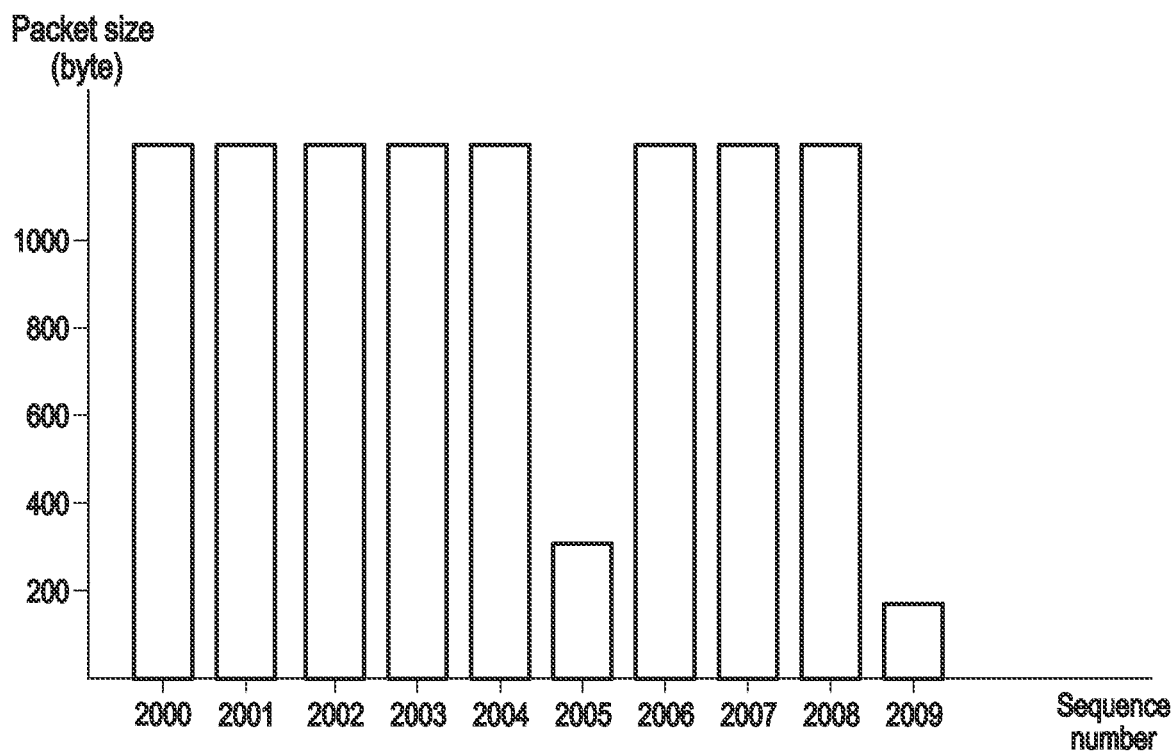
FIG. 3B is a view illustrating a size of a packet according to an embodiment of the disclosure.

FIG. 3B is a view illustrating a size of a packet according to an embodiment of the disclosure.

Referring to FIG. 3B, according to an embodiment of the disclosure, it illustrates the size of the packet according to the sequence number when the I-frame of FIG. 3A is transmitted in succession of the P-frame. For example, as shown in FIG. 3B, it may be assumed that the maximum transmission unit (MTU) of the packet is 1.5 Kbytes. For example, when the size of the I-frame is 7.8 Kbytes, one I-frame may be divided into five MTU packets and a 300-byte packet (six packets in total) and transmitted. For example, when the size of the P-frame is 4.7 Kbytes, one I-frame may be divided into three MTU packets and a 200-byte packet (four packets in total) and transmitted. Meanwhile, when the size of the P-frame does not exceed 1.5 Kbyte, it may be transmitted as one packet.

According to an embodiment of the disclosure, when one or more MTU packets and the packet smaller in size than the MTU are contiguous, the processor 210 may determine that the first MTU packet among the one or more MTU packets is the first packet of the frame, and the packet smaller in size is the last packet of the frame. For example, the processor 210 may determine that the contiguous MTU packets from the first packet to the packet smaller in size than the MTU packet are packets corresponding to one frame. For example, when the sequence number 2000 packet to the sequence number 2004 packet are MTU packets, and the size of the sequence number 2005 packet is smaller than that of the MTU packet in FIG. 3B, the processor 210 may identify that the sequence number 2000 packet to the sequence number 2005 packet are packets transmitting one frame. For example, when the sequence number 2006 packet to the sequence number 2008 packet are MTU packets, and the size of the sequence number 2009 packet is smaller than that of the MTU packet in FIG. 3B, the processor 210 may identify that the sequence number 2006 packet to the sequence number 2009 packet are packets transmitted in one frame. Through this process, the processor 210 may identify the size of the plurality of frames. The transmission time difference between the packets constituting one frame may be smaller than the transmission time difference between the packets constituting another frame. Accordingly, when the inter-packet transmission time difference is smaller than a specific value regardless of the packet size, the processor 210 may determine that it is included in a set of frame packets. For example, the set of frame packets may mean the packets constituting one frame.

According to an embodiment of the disclosure, the processor 210 may detect P-frames among the packets transmitted/received by the first external electronic device. For example, the processor 210 may estimate whether a corresponding frame is a P-frame based on the size of the set of a plurality of packets corresponding to one frame. The processor 210 may determine whether the frame is an I-frame or a P-frame depending on the frame size. For example, when the size of the frame exceeds 10MTU, the processor 210 may identify that the frame is an I-frame. The processor 210 may remove the frames determined as I-frames among the plurality of frames to detect P-frames. 10MTU which is a threshold is exemplary, and may be a designated value or a value identified based on the received packet size. Meanwhile, the processor 210 may exclude frames whose size falls outside a specific range among the frames.

According to an embodiment of the disclosure, the processor 210 may obtain the P-frame pattern during a first time period. The P-frame pattern may mean the sizes of the P-frames according to time. The first time period may be a time period during which the user does not move. For example, the processor 210 may provide a guide to remain in the static state during a set time to the user, through the display 240.

According to an embodiment of the disclosure, the processor 210 may obtain a first threshold using the P-frame pattern of the first time period. The first threshold may be a value to determine whether the image captured by the first external electronic device includes a motion. For example, the processor 210 may calculate a standard normal distribution for the sizes of the P-frames by standardizing the normal distribution for the size distributions of the P-frames during the first time period. The processor 210 may calculate a range in which a specific ratio for the size of the P-frame is to be included, using the standard normal distribution.

For example, the processor 210 may calculate that among all the P-frame sizes, 80% are included between the upper bound (e.g., $Z+1.28\sigma$) and the lower bound (e.g., $Z-1.28\sigma$) and determine that the upper bound is the first threshold. Specifically, Z may be the value obtained by dividing the mean of the P-frame sizes minus the mean (or expected value) of the P-frame sizes by the standard deviation 6 of the P-frame sizes, when the size of the P-frame is used as a variable.

According to an embodiment of the disclosure, the processor 210 may obtain the P-frame pattern or RSSI pattern during a second time period. The second time period may be a time period during which the user moves. For example, the processor 210 may provide a guide to remain in the moving state during a set time to the user, through the display 240. For example, the guide to remain in the moving state may be a guide to let the user move around the space where the user is located.

According to an embodiment of the disclosure, the processor 210 may identify that the first external electronic device is a capture device for capturing the space where the electronic device 200 is located, based on the P-frame or RSSI pattern during the second time period. The processor 210 may obtain a second threshold using the P-frame or RSSI pattern during the second time period. When the P-frame pattern is used, the processor 210 may identify the P-frames which exceed (or are not less than) the first threshold during the second time period. For example, the processor 210 may determine that the upper bound (e.g., $\bar{X}+1.65\sigma$) where 90% of the P-frame sizes exceeding the first threshold are included is the second threshold. In determining the second threshold, since the variables are sizes of P-frames that exceed the first threshold, $\bar{X}$ and $\sigma$ for determining the second threshold may differ from $\bar{X}$ and $\sigma$ for calculating the first threshold. When the RSSI pattern is used, the processor 210 may determine that the upper bound (e.g., $\bar{X}+1.65\sigma$) where 90% of the RSSI sizes are included is the second threshold.

The processor 210 may determine that the time periods during which the P-frames or RSSIs exceeding (or not less than) the second threshold are time periods during which a motion is captured.

According to an embodiment of the disclosure, the processor 210 may identify the motion vector for the second time period through the sensor 230. The processor 210 may obtain data on the acceleration of each of the x-axis, y-axis, and z-axis, including gravity, from an accelerometer. The processor 210 may obtain data on rotation speed about each of the x-axis, y-axis, and z-axis from a gyroscope. The processor 210 may identify the motion vector indicating the distance and direction the user moved based on the data on the acceleration and the data on the rotation speed. The processor 210 may calculate the number of steps of the user based on the data on the acceleration obtained through the accelerometer, or may receive data on the number of steps of the user from an auxiliary computing device (e.g., a pedometer). The processor 210 may calculate the user's moving distance in proportion to the number of steps taken by the user.

According to an embodiment of the disclosure, the processor 210 may determine whether the first external electronic device captures the space where the user is currently located, according to the correspondence between the P-frame or RSSI pattern during the second time period and the motion vector during the second time period. The processor 210 may provide location information about the first external electronic device, according to the correspondence between the size change pattern of P-frame or RSSI, measured during the second time period, and the motion vector during the second time period. The processor 210 may identify a period during which the size of the P-frame or RSSI during the second time period exceeds the second threshold. For example, the period during which the second threshold is exceeded may mean a time period during which a motion is captured. The time period during which the user moves may be identified based on the user's motion vector. If the period during which the second threshold is exceeded is identical to the time period during which the user moves, the processor 210 may determine that the first external electronic device captures the space where the user is located. For example, if there is no user motion in the period during which the second threshold is exceeded, the processor 210 may determine that the first external electronic device captures a motion that is not a user motion.

Figure 4:
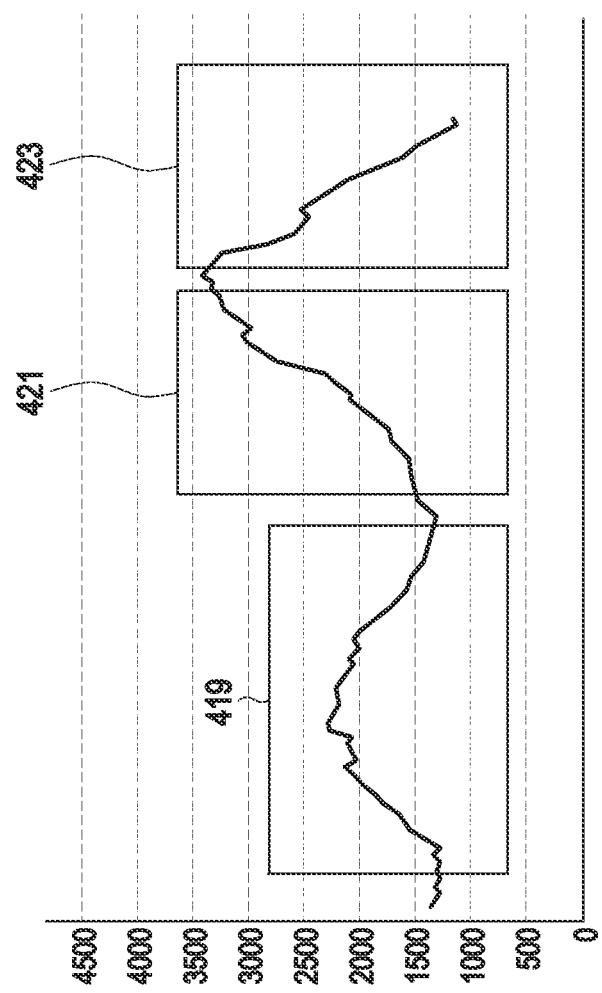
FIG. 4 is a view illustrating a change in a size of a P-frame due to a user's motion according to an embodiment of the disclosure.
Figure 4:
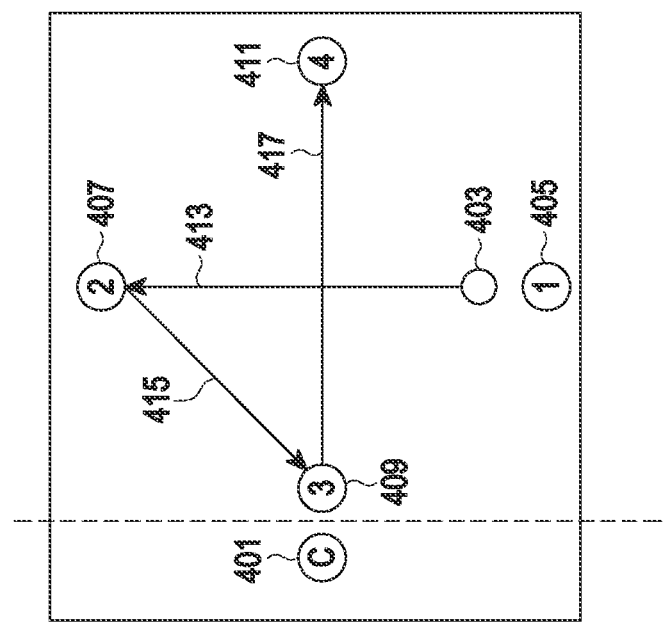

FIG. 4 is a view illustrating a change in P-frame size according to a user motion according to an embodiment of the disclosure.

For example, when the first external electronic device captures the user, the user's motion to move away from or closer to the first external electronic device may be referred to as a vertical motion, and the user's motion to the left or right while maintaining the vertical distance from the first external electronic device may be referred to as a horizontal motion.

Referring to FIG. 4, when the camera 401 captures the right side, the motion of the user 403 between ③ 409 and ④ 411 may be referred to as the vertical motion, and the motion between ① 405 and ② 407 may be referred to as the horizontal motion. In the case of the horizontal motion, the user's length displayed on the screen may be constant and, in the case of the vertical motion, the user's length may be changed.

For example, since the P-frame is a frame representing a difference between two or more image frames, it may be associated with the one-dimensional length of the object corresponding to the user included in any one of the two or more image frames. For example, the size of the P-frame may be proportional to the square of the length of the object corresponding to the user included in the current image frame, the square of the length of the object corresponding to the user included in the previous image frame, or the square of the variation between the length of the object corresponding to the user included in the current image frame and the length of the object corresponding to the user included in the previous image frame. The degree of change in the size of the object corresponding to the user included in each image frame when the user moves vertically may be larger than the degree of change in the size of the object corresponding to the user included in each image when the user moves horizontally. Accordingly, the change in P-frame size when the user vertically moves may be larger than the change in P-frame size when the user horizontally moves. For example, as shown in FIG. 4, the user may move in the order of ①(405)->②(407)->③(409)->④(411). The first pattern 419 of the P-frame may be a pattern corresponding to the path 413 where the user moves from ①(405) to ②(407). While the user moves from ①(405)->②(407), such a pattern may be obtained where as the user moves closer to the center of camera, the P-frame size may increase and, when the user is located in the center of the camera, the P-frame size may have the maximum value, and as the user moves away from the center of the camera, the P-frame size may reduce. The second pattern 421 of the P-frame may be a pattern corresponding to the path 415 where the user moves from ②(407)->③(409). While the user moves from ②(407)->③(409), such a pattern may be obtained where as the vertical distance gets closer, the size of the P-frame increases. The third pattern 423 of the P-frame may be a pattern corresponding to the path 417 where the user moves from ③(409) to ④(411). While the user moves from ③(409)->④((411), such a pattern may be obtained where as the vertical distance gets farther away, the size of the P-frame decreases. Meanwhile, the rate of the change in P-frame size may be larger when the user moves in the path 415 from ②(407)->③(409) or the user moves in the path 417 from ③(409)->④(411) than when the user moves in the path 413 from ①(405)->②(407) (that is, when the user performs the vertical motion rather than the horizontal motion). Accordingly, the processor 210 may determine the position of the camera using the distance and direction in which the user has moved based on the motion vector and the change in P-frame size.

Figure 5:
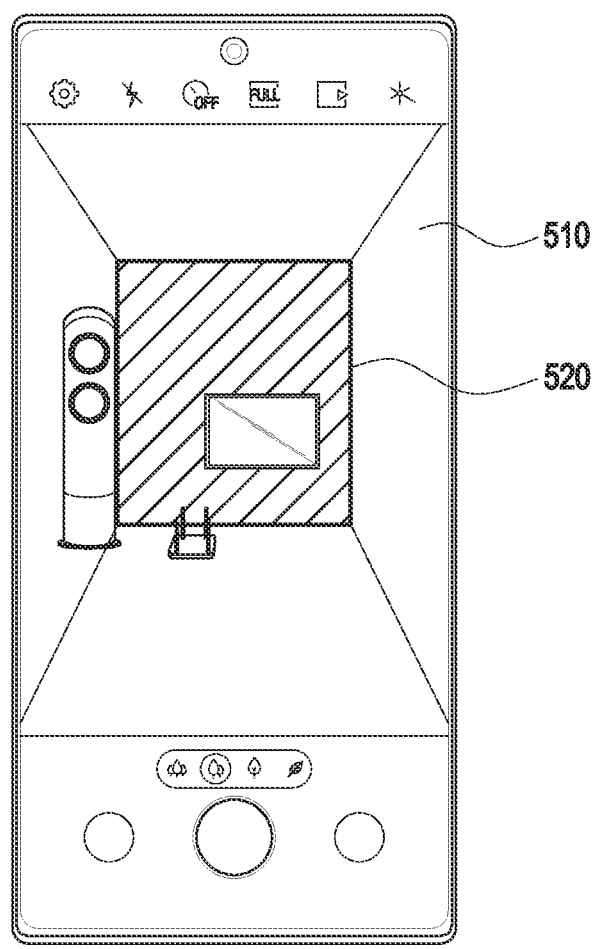
FIG. 5 is a view illustrating a method for indicating a position of an external electronic device according to an embodiment of the disclosure.

FIG. 5 is a view illustrating a method for indicating a position of an external electronic device according to an embodiment of the disclosure.

Referring to FIG. 5, according to an embodiment of the disclosure, the processor 210 may provide the location information about the camera to the user. The processor 210 may provide information about the direction in which the camera is located and the vertical distance between the camera and the user. Or, the processor 210 may lead the user to capture the space using the camera as shown in FIG. 5 and provide it as an augmented reality content 500 to display an area 520 corresponding to the camera location information, in a different color, on the captured actual image 510. Further, as the area of the portion inferred as the camera being present narrows, the area displayed in the different color may be displayed in a reduced size.

According to an embodiment of the disclosure, the communication circuit 220 may establish a direct (e.g., wired) communication channel or a wireless communication channel between the electronic device 101 and the external electronic device or support communication through the established communication channel. The communication circuit 220 may include one or more communication processors that are operable independently from the processor 210 (e.g., the application processor (AP)) and supports a direct (e.g., wired) communication or a wireless communication. According to an embodiment of the disclosure, the communication circuit 220 may include a wireless communication module (e.g., a cellular communication module, a short-range wireless communication module, or a global navigation satellite system (GNSS) communication module) or a wired communication module (e.g., a local area network (LAN) communication module or a power line communication (PLC) module). A corresponding one of these communication modules may communicate with the external electronic device via the first network (e.g., a short-range communication network, such as Bluetooth™, wireless-fidelity (Wi-Fi) direct, or infrared data association (IrDA)) or the second network (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module may identify and authenticate the electronic device 101 in a communication network, such as the first network or the second network, using subscriber information (e.g., international mobile subscriber identity (IMSI)) stored in the subscriber identification module.

According to an embodiment of the disclosure, the communication circuit 220 may operate in Wi-Fi mode (or managed mode), and the communication circuit 220 operating in Wi-Fi mode may transmit/receive data to/from the external electronic device. According to an embodiment of the disclosure, the communication circuit 220 may operate in monitor mode, and the communication circuit 220 operating in monitor mode may identify (or gather) packets communicated by at least one external electronic device using a wireless router (access point (AP)). For example, the communication circuit 220 may establish a specific Wi-Fi channel and identify information about at least some packets communicated on the established Wi-Fi channel. The communication circuit 220 may identify information about the channel while changing the Wi-Fi channel. For example, the packet information may include identification information about the device (source) transmitting the packet and identification information about the device (destination) receiving the packet.

According to an embodiment of the disclosure, the sensor 230 may detect the environmental state (e.g., user state) outside the electronic device 101 or the operational state (e.g., power or temperature) of the electronic device 101 and generate an electrical signal or data value corresponding to the detected state. According to an embodiment of the disclosure, the sensor 230 may include, e.g., a gyroscope, an accelerometer, a gesture sensor, a pedometer, a magnetometer, an atmospheric pressure sensor, a grip sensor, a proximity sensor, a color sensor, an infrared (IR) sensor, a bio sensor, a temperature sensor, a humidity sensor, or an illuminance sensor.

According to an embodiment of the disclosure, the sensor 230 (e.g., gyroscope or accelerometer) may detect the direction and distance the user moves. According to an embodiment of the disclosure, the sensor 230 (e.g., pedometer) may count the number of steps taken by the user.

According to an embodiment of the disclosure, the display 240 may provide visual information to the outside (e.g., the user) of the electronic device 101. According to an embodiment of the disclosure, the display device 140 may include, for example, a display, a hologram device, or a projector and control circuitry to control a corresponding one of the display, hologram device, and projector. According to an embodiment of the disclosure, the display device 140 may include touch circuitry adapted to detect a touch, or sensor circuitry (e.g., a pressure sensor) adapted to measure the intensity of force incurred by the touch.

According to an embodiment of the disclosure, the display 240 may receive a display control signal from the processor 210. According to an embodiment of the disclosure, the display control signal may include at least one of a command to display a UI to suggest the user to move, a command to display a UI to indicate detection of a capture device, or a command to display the position of the capture device.

According to an embodiment of the disclosure, the memory 250 may store various data used by at least one component (e.g., the processor 210 or the sensor 230) of the electronic device 101. The various data may include, for example, software (e.g., the program) and input data or output data for a command related thereto. According to an embodiment of the disclosure, the memory 250 may include a volatile or non-volatile memory. The program may be stored, as software, in the memory 250 and may include, e.g., an operating system (OS), middleware, or an application.

According to an embodiment of the disclosure, the memory 250 may store information about the uplink packet-downlink packet ratio to determine as being a capture device or information about the threshold of the P-frame or RSSI size to determine that a motion is captured.

Figure 6:
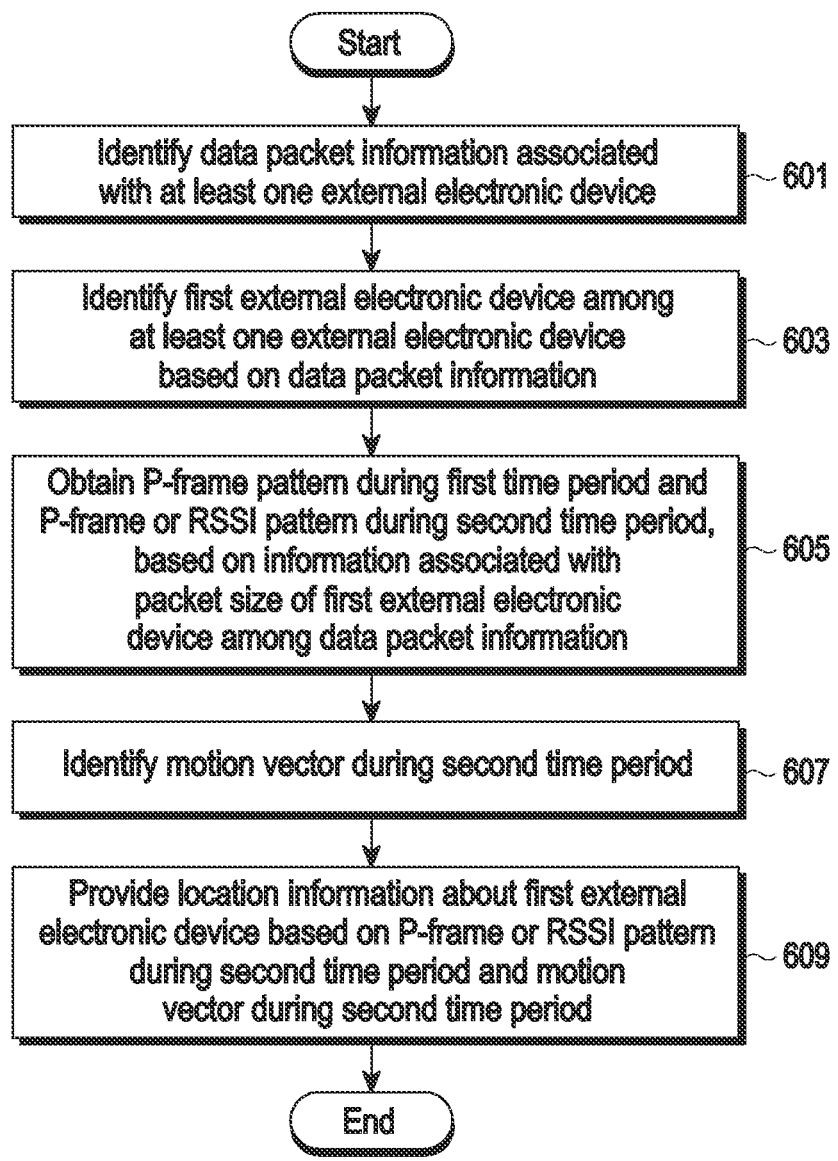
FIG. 6 is a flowchart illustrating a method of an electronic device according to an embodiment of the disclosure.

FIG. 6 is a flowchart illustrating a method of an electronic device according to an embodiment of the disclosure.

The operations of FIG. 6 is not limited in order, and other operation(s) may intervene between two adjacent operations. At least some of the operations of FIG. 6 may be omitted, and the description herein may apply likewise to all of the flowcharts. In the disclosure, when the electronic device 200 performs a specific operation, the processor 210 of the electronic device 200 may perform the specific operation, or the processor 210 may control other hardware to perform the specific operation. In the disclosure, when the electronic device 200 performs a specific operation, instructions stored in the memory 250 may be executed to enable the processor 210 or other hardware to perform the specific operation, and instructions that trigger the specific operation may be stored in the memory 250. The embodiment of FIG. 6 is described with reference to FIGS. 7, 8A, 8B, 9A, 9B, 10A, and 10B.

Figure 7:
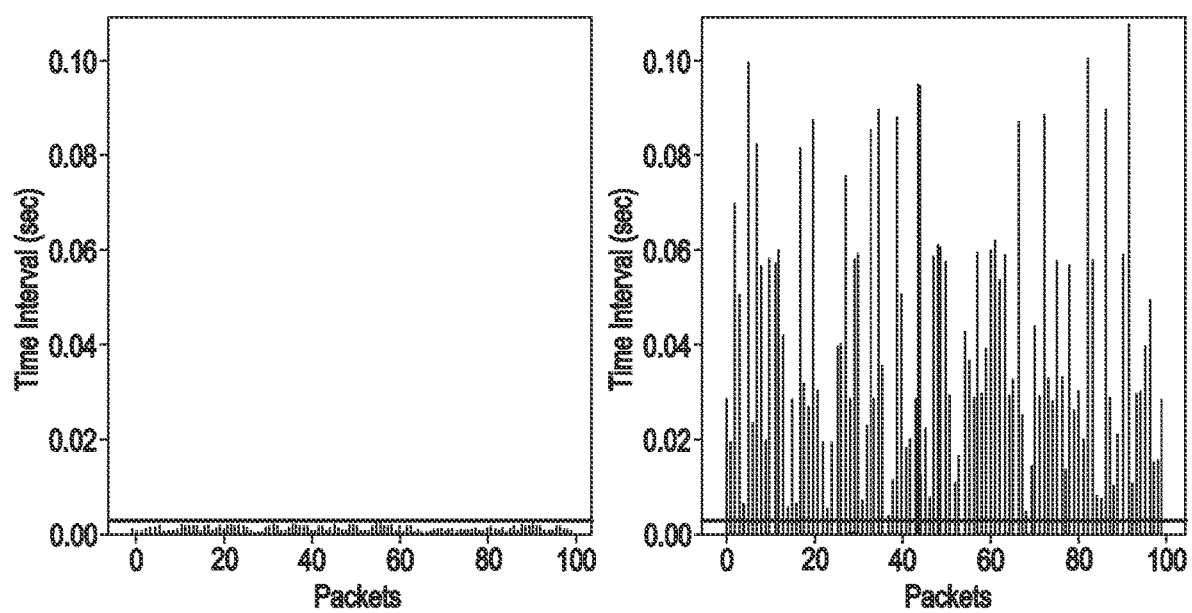
FIG. 7 is a view illustrating a method for identifying a frame according to an embodiment of the disclosure.

FIG. 7 is a view illustrating a method for identifying a frame according to an embodiment of the disclosure.

Figure 8A:
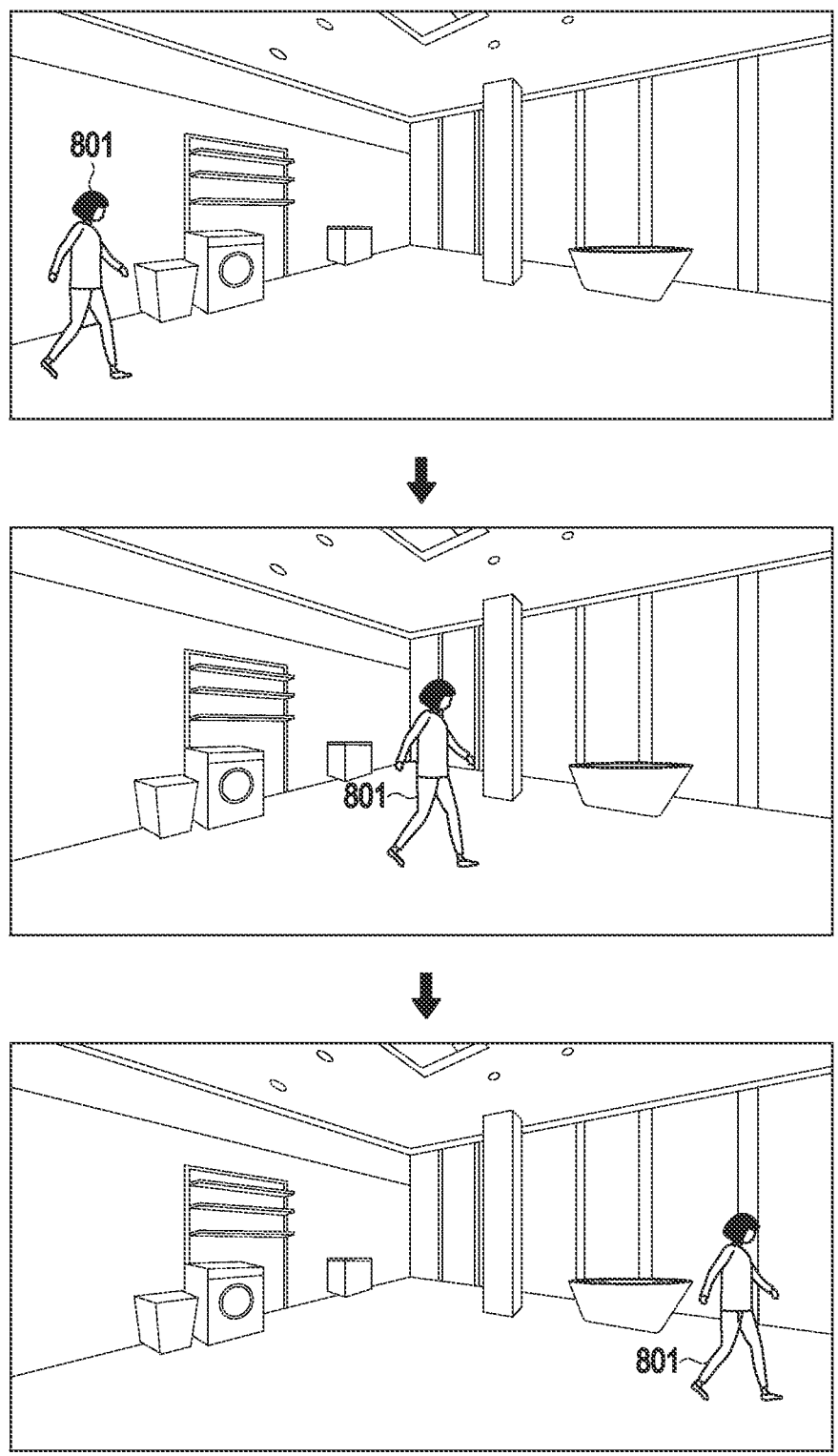
FIG. 8A is a view illustrating a user's horizontal motion according to an embodiment of the disclosure.

FIG. 8A is a view illustrating a user's horizontal motion according to an embodiment of the disclosure.

Figure 8B:
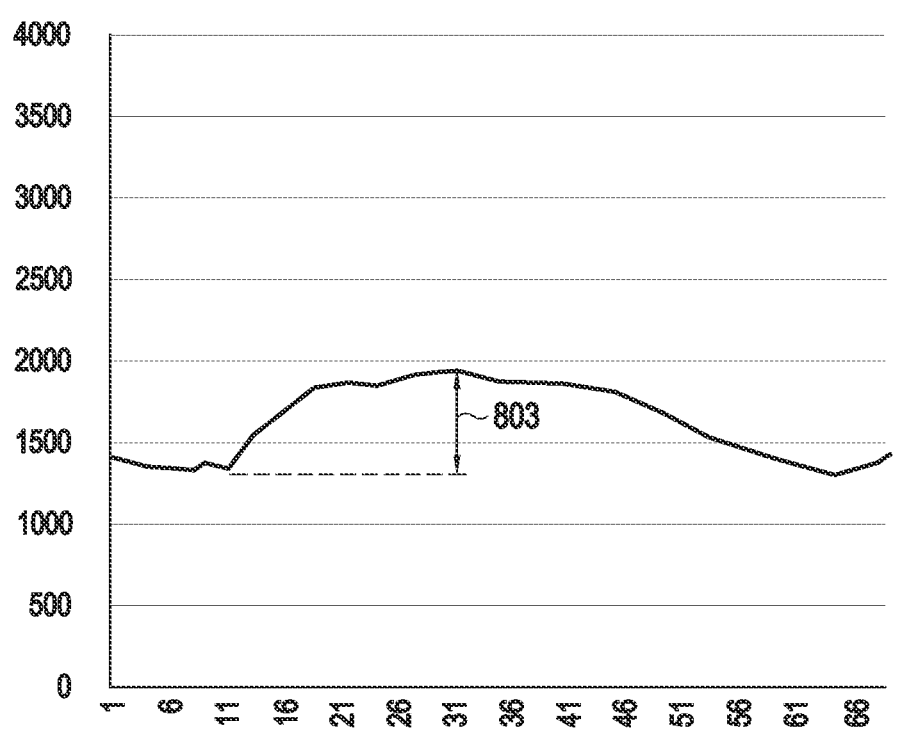
FIG. 8B is a view illustrating a pattern of a p-frame corresponding to a user's horizontal motion according to an embodiment of the disclosure.

FIG. 8B is a view illustrating a pattern of a p-frame corresponding to a user's horizontal motion according to an embodiment of the disclosure.

Figure 9A:
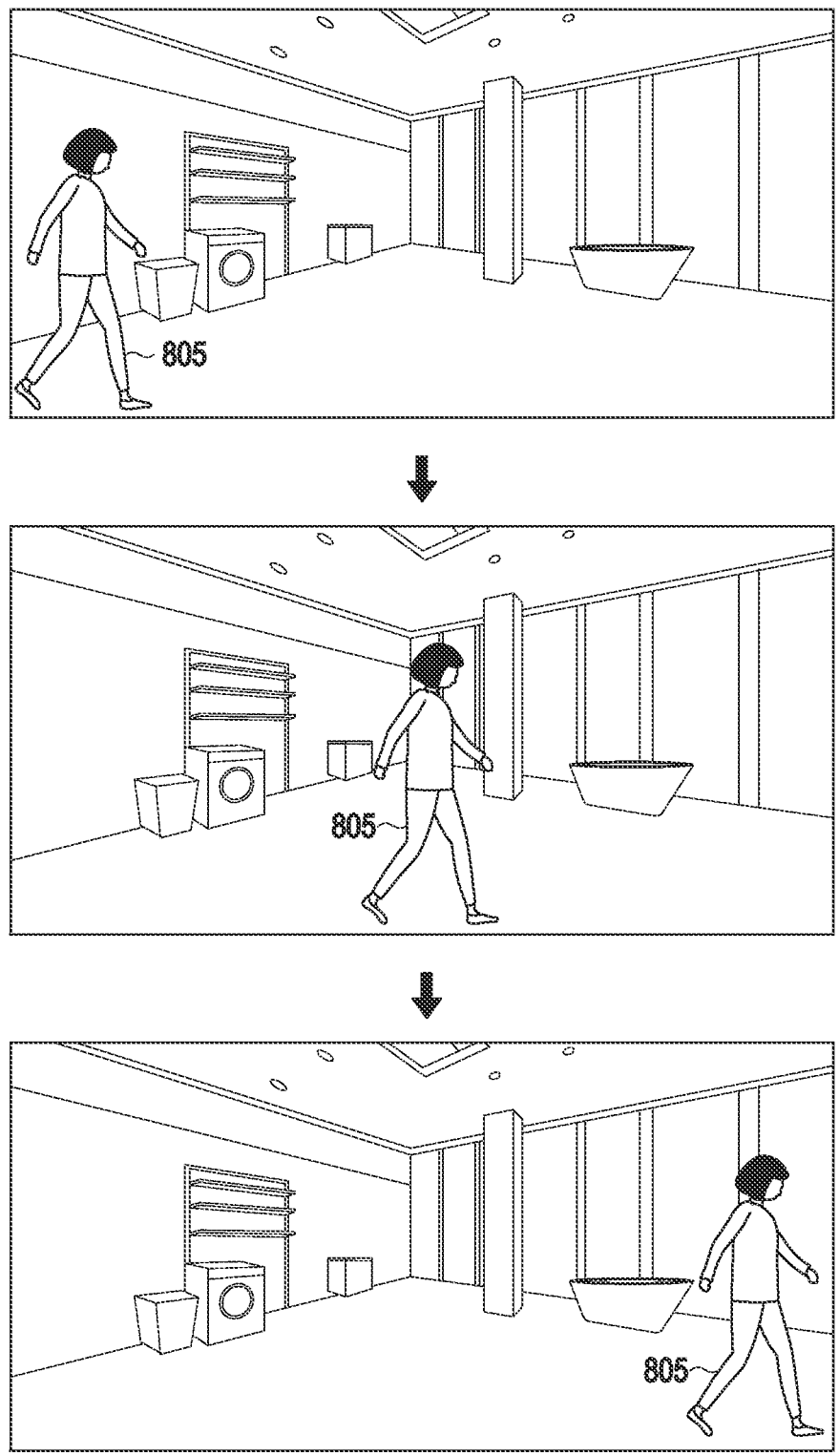
FIG. 9A is a view illustrating a user's horizontal motion according to an embodiment of the disclosure.

FIG. 9A is a view illustrating a user's horizontal motion according to an embodiment of the disclosure.

Figure 9B:
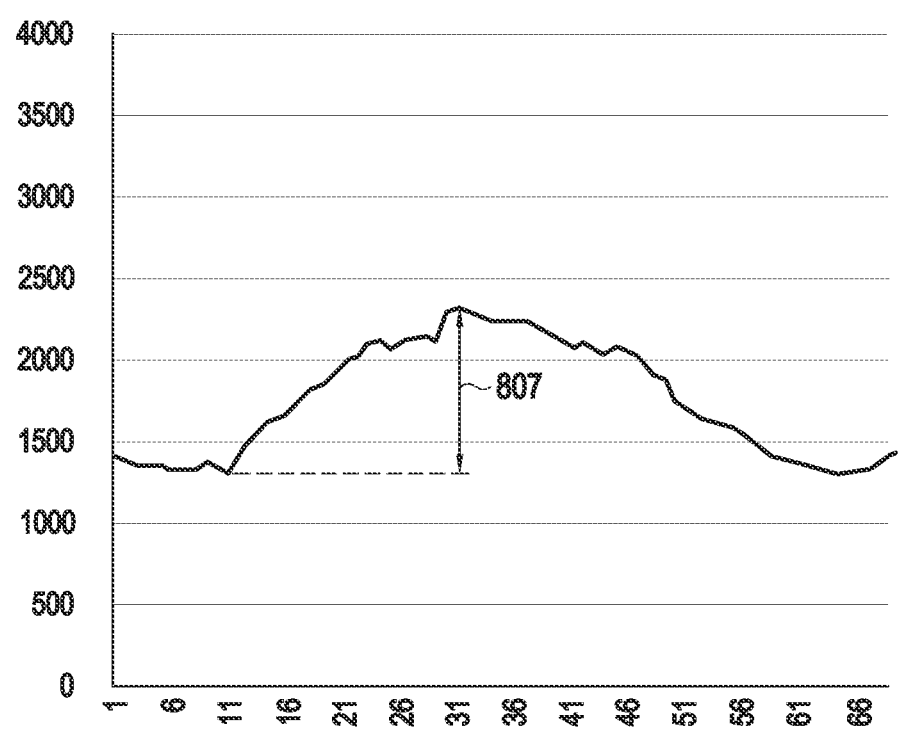
FIG. 9B is a view illustrating a pattern of a p-frame corresponding to a user's horizontal motion according to an embodiment of the disclosure.

FIG. 9B is a view illustrating a pattern of a p-frame corresponding to a user's horizontal motion according to an embodiment of the disclosure.

Figure 10A:
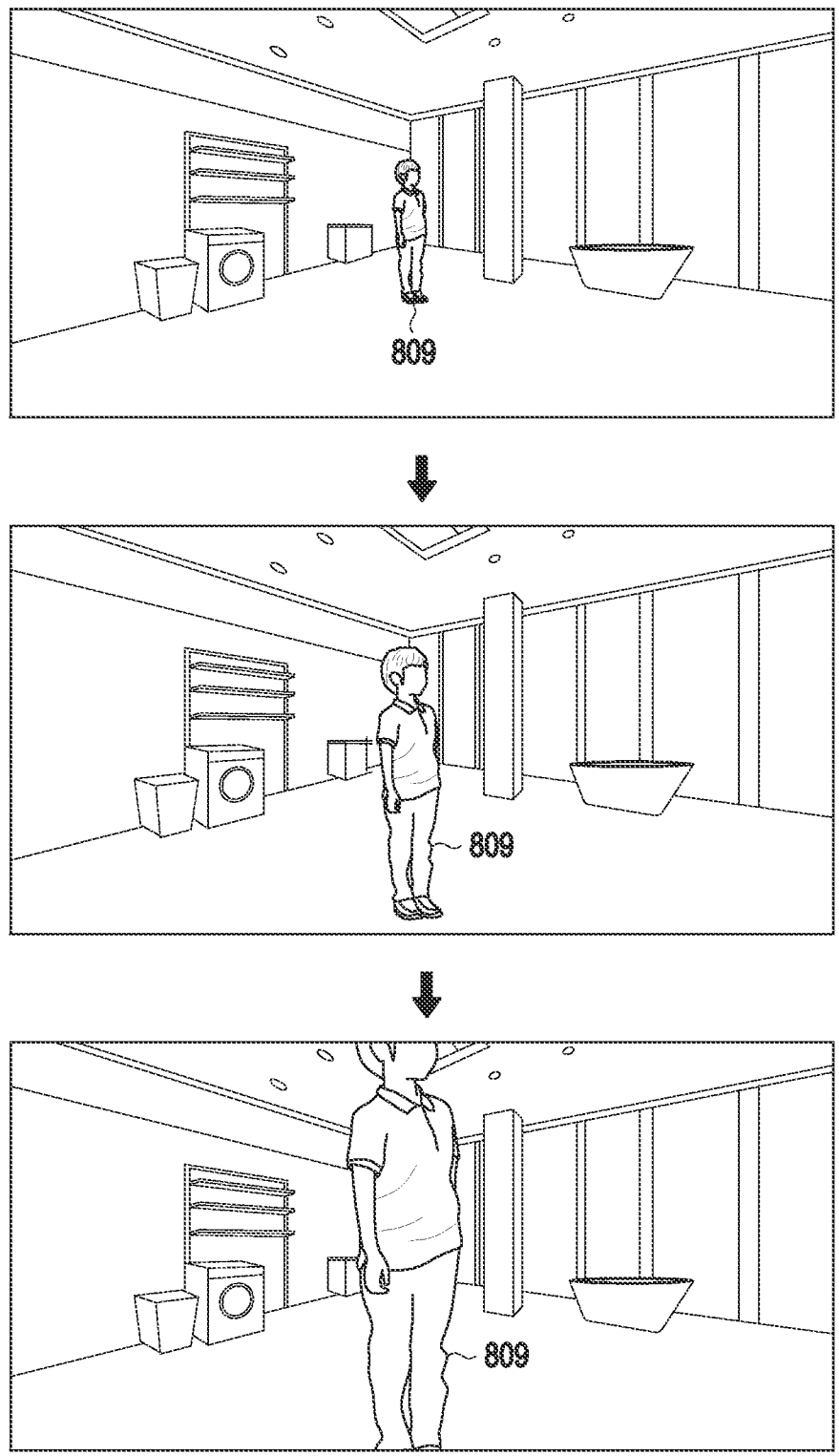
FIG. 10A is a view illustrating a user's vertical motion according to an embodiment of the disclosure.

FIG. 10A is a view illustrating a user's vertical motion according to an embodiment of the disclosure.

Figure 10B:
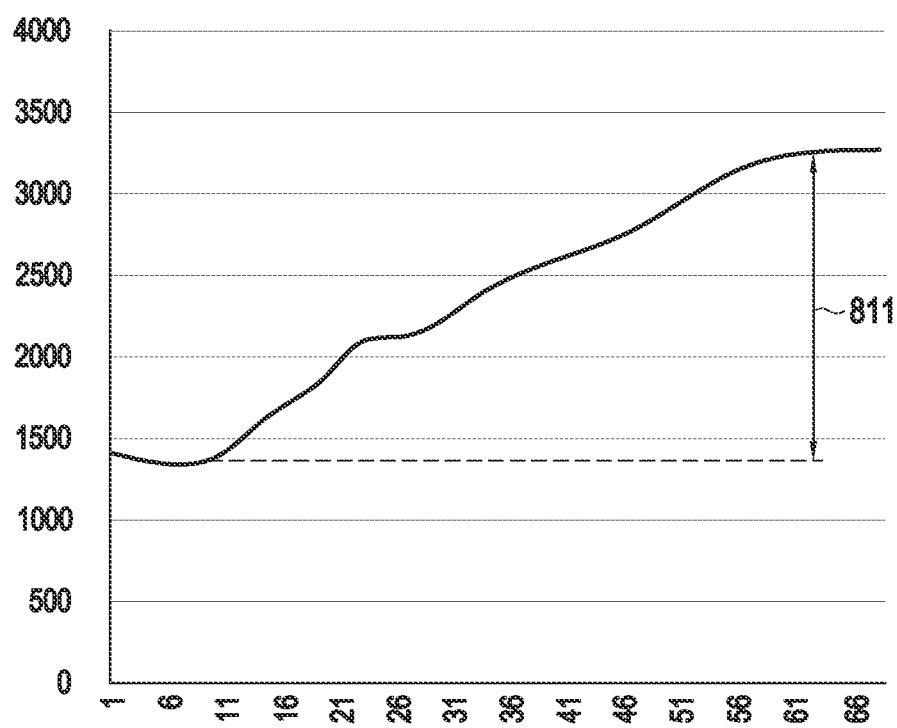
FIG. 10B is a view illustrating a pattern of a p-frame corresponding to a user's vertical motion according to an embodiment of the disclosure.

FIG. 10B is a view illustrating a pattern of a p-frame corresponding to a user's vertical motion according to an embodiment of the disclosure.

Referring to FIGS. 6, 7, 8A, 8B, 9A, 9B, 10A, and 10B, according to various embodiments of the disclosure, in operation 601, the electronic device 200 (e.g., the processor 210) may identify data packet information associated with at least one external electronic device. The electronic device 200 may capture the packets transmitted/received between the wireless router and at least one external electronic device. For example, the electronic device 200 may gather the packets communicated by at least one external electronic device using the wireless router while operating in the monitor mode. For example, the data packet information may include at least some of identification information about the device transmitting the packet, identification information about the device receiving the packet, information about the packet size, and information about the time when the packet is communicated.

According to various embodiments of the disclosure, in operation 603, the electronic device 200 may identify a first external electronic device among the at least one external electronic device based on the data packet information. For example, the first external electronic device may mean an electronic device 200 performing live-streaming. When the identification information about the device transmitting the packet is external electronic device and/or the identification information about the device receiving the packet is identification information about the wireless router based on the data packet information, the electronic device 200 may determine that it is an uplink packet. Or, when the identification information about the device transmitting the packet is the identification information about the wireless router and/or the identification information about the device receiving the packet is external electronic device, the electronic device 200 may determine that the file is a downlink packet. When the ratio of uplink packets to the packets communicated by a specific external electronic device exceeds a designated value, the electronic device 200 may identify that the specific external electronic device is the first external electronic device (e.g., the electronic device performing live-streaming).

According to various embodiments of the disclosure, in operation 605, the electronic device 200 may obtain the P-frame pattern during a first time period and the P-frame or RSSI pattern during a second time period based on the information associated with the packet size of the first external electronic device among the data packet information. The electronic device 200 may identify frames based on the data packet information transmitted/received by the first external electronic device. The frame may be split into a plurality of packets according to the size and be transmitted. A plurality of packets corresponding to one frame may be referred to as a set of packets. Since the frame may be split into successive MTU packets and a packet smaller in size than the MTU packet depending on the size of the frame, the electronic device 200 may determine that the successive MTU packets and the packet smaller in size than one MTU packet are one frame. When the transmission time interval between contiguous packets is a designated time or less, the electronic device 200 may determine that the contiguous packets are a set of packets corresponding to one frame. Part (a) of FIG. 7 may illustrate a time interval between in-frame packets, and part (b) of FIG. 7 may illustrate a time interval between inter-frame packets. For example, as shown in part (a) of FIG. 7, the transmission time interval between adjacent packets included in the set of packets corresponding to one frame may be smaller than 0.02 seconds. The transmission time interval between packets corresponding to different frames may be larger than the transmission time interval between packets corresponding to one frame, as shown in part (b) of FIG. 7. Accordingly, when the transmission time interval between contiguous packets is a designated time or less, the electronic device 200 may determine that the contiguous packets are a set of packets corresponding to one frame.

The electronic device 200 may identify the P-frame based on the size of the frame (i.e., the set of packets corresponding to the frame). When the size of the frame is included in a designated range, the electronic device 200 may determine that it is the P-frame. As an example, the electronic device 200 may determine whether the corresponding frame is the P-frame based on the number of MTU packets among the set of packets determined as one frame. For example, when the number of MTU packets is 10 or more among the packets corresponding to the frame, the electronic device 200 may determine that the frame is the I-frame. For example, the electronic device 200 may remove the frames determined as I-frames among the plurality of frames to detect P-frames. Or, the electronic device 200 may manage the range associated with the number of MTU packets corresponding to the P-frame and determine whether the frame is the P-frame based on whether the number of MTU packets of the specific frame is included in the designated range.

The electronic device 200 may obtain the P-frame pattern during a first time period. For example, the P-frame pattern may mean sizes of P-frames according to time. The first time period may be a time period during which the user does not move. During the first time period, the electronic device 200 may provide a guide to remain in the static state through the display 240 or a speaker (not shown). The electronic device 200 may calculate a threshold for determining whether motion is captured during the second time period based on the sizes of the P-frames during the first time period.

The electronic device 200 may obtain the P-frame pattern or RSSI pattern during a second time period. For example, the second time period may be a time following the first time period and may be a time period during which the user moves. For example, the electronic device 200 may provide a guide to remain in the moving state during a set time to the user, through the display 240 or a speaker (not shown). For example, the guide to remain in the moving state may be a guide to let the user move around the space where the user is located.

According to various embodiments of the disclosure, in operation 607, the electronic device 200 may identify the motion vector during the second time period. The electronic device 200 may identify the motion vector indicating the distance and direction that the user has moved during the second time period based on the data detected through the accelerometer and/or gyroscope.

According to various embodiments of the disclosure, in operation 609, the electronic device 200 may provide location information about the first external electronic device based on the P-frame or RSSI pattern during the second time period and the motion vector during the second time period.

The electronic device 200 may determine the user's motion based on the P-frame pattern. Since the P-frame size may correspond to a variation in size (or length) between the object corresponding to the user included in the current image frame and the object corresponding to the user included in the previous image frame, the electronic device 200 may determine a variation in the size of the object corresponding to the user based on the variation in P-frame size. When the size of the object corresponding to the user increases, the electronic device 200 may determine that it moves in the direction closer to the first external electronic device. When the size of the object corresponding to the user decreases, the electronic device 200 may determine that it moves in the direction away from the first external electronic device.

Referring to FIG. 8A, the variation in P-frame size when the user 801 moves in the horizontal direction may be relatively smaller than that when the user 801 moves in the vertical direction. Here, the horizontal direction may mean a direction defined by the capture surface captured by the camera. The vertical direction may mean a direction perpendicular to the capture surface captured by the camera. Meanwhile, it may not occur in practice for the camera to move exactly parallel to or exactly perpendicular to the capture plane it captures. In the disclosure, the motion in the horizontal direction may mean when the vector component for the direction perpendicular to the capture surface among the user's moving directions is a threshold or less, and the motion in the vertical direction may mean when the vector component for the direction perpendicular to the capture surface among the user's moving directions exceeds the threshold, but it will be appreciated by one of ordinary skill in the art that the description of the directions is merely an example. For example, when the user moves in the horizontal direction as shown in FIG. 8A, the P-frame pattern may exhibit that the size of the P-frame increases and then decreases corresponding to the user's motion as shown in FIG. 8B. Further, since the variation in motion is small, the variation 803 in P-frame size may be small.

For example, when the user 805 moves in the horizontal direction from a distance close to the first external electronic device as shown in FIG. 9A, the variation in P-frame size may be larger than when the user 801 moves in the horizontal direction from a distance far from the first external electronic device. Accordingly, when the user moves in the horizontal direction as shown in FIG. 9A, the P-frame pattern may show that the size of the P-frame increases and then decreases corresponding to the user's motion as shown in FIG. 9B. In this case, since the variation in motion may be larger than when the user 801 moves in the horizontal direction from a distance far away from the first external electronic device, the variation 807 in P-frame may be larger than the variation 803 in P-frame size in FIG. 8B.

For example, when the user 809 vertically moves closer to the first external electronic device as shown in FIG. 10A, the variation in P-frame size may increase. When the user moves closer to the first external electronic device, the P-frame pattern may increase as shown in FIG. 10B, since the variation in the size of the object corresponding to the user in the captured image is large as shown in FIG. 10A. The amount 811 of the increase in P-frame size may increase as the user gets closer to the first external electronic device.

The electronic device 200 may determine the user's motion based on the P-frame pattern during the second time period. The electronic device 200 may determine whether the determined user's motion corresponds to the motion vector during the second time period. For example, upon determining that the user has moved in a first direction based on the motion vector and that the user moves closer to the first external electronic device based on the P-frame pattern, the electronic device 200 may determine that the first external electronic device is located in the first direction. The electronic device 200 may display a screen indicating that the first external electronic device is located in the first direction.

The electronic device 200 may determine the user's motion based on the RSSI pattern. Since the RSSI size may correspond to the variation in distance between the electronic device 200 and the external electronic device, the electronic device 200 may determine the distance between the electronic device 200 and the external electronic device based on the variation in RSSI size. When the RSSI size increases, the electronic device 200 may determine that it moves in the direction closer to the first external electronic device. When the RSSI size decreases, the electronic device 200 may determine that it moves in the direction away from the first external electronic device.

The electronic device 200 (e.g., the processor 210) may identify a plurality of frames associated with the first external electronic device. The electronic device 200 may identify a set of the plurality of packets corresponding to one frame based on the transmission time interval between the packets transmitted/received by the first external electronic device. The transmission time interval between the contiguous packets corresponding to one frame may be smaller than the transmission time interval between the contiguous packets corresponding to different frames. When the transmission time interval between contiguous packets is smaller than (or not more than) a designated value, the electronic device 200 may determine that the contiguous packets are a set of packets corresponding to one frame.

According to various embodiments of the disclosure, the electronic device 200 may identify P-frames among a second plurality of frames. The electronic device 200 may identify the P-frames based on the sizes of the second plurality of frames. For example, the electronic device 200 may determine whether the frame is the I-frame or P-frame depending on the size of the frame. For example, the electronic device 200 may remove the frames determined as I-frames among the second plurality of frames to identify P-frames.

Figure 11A:
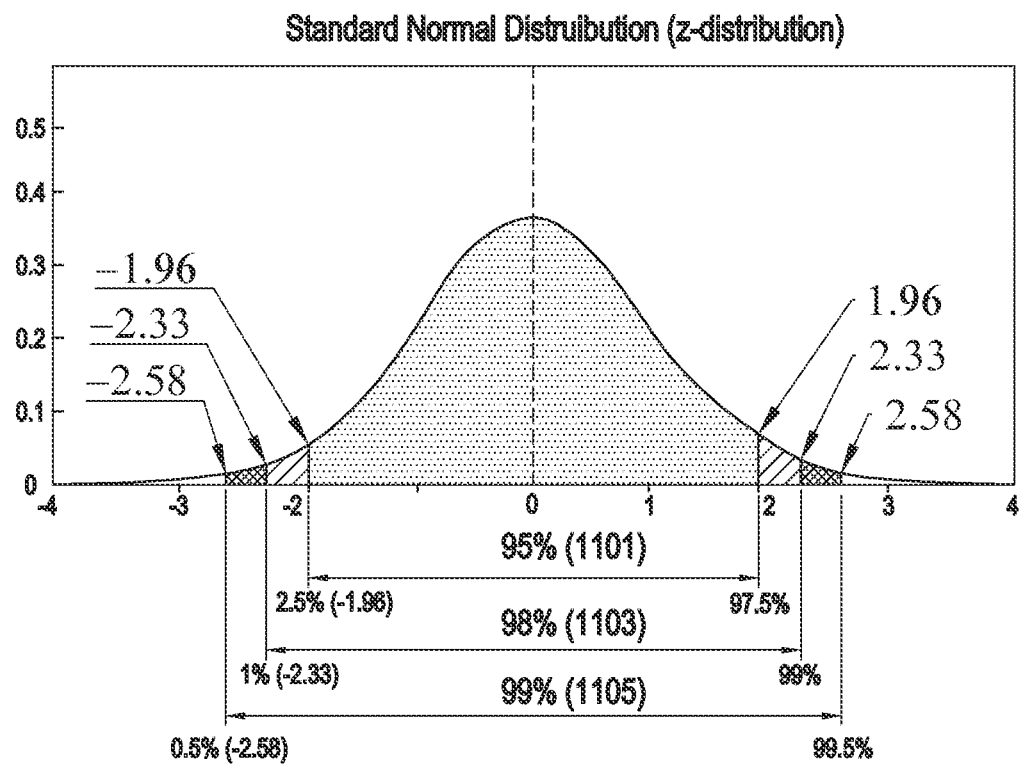
FIG. 11A is a view illustrating a method for setting a threshold according to an embodiment of the disclosure.

FIG. 11A is a view illustrating a method for setting a threshold according to an embodiment of the disclosure.

Figure 11B:
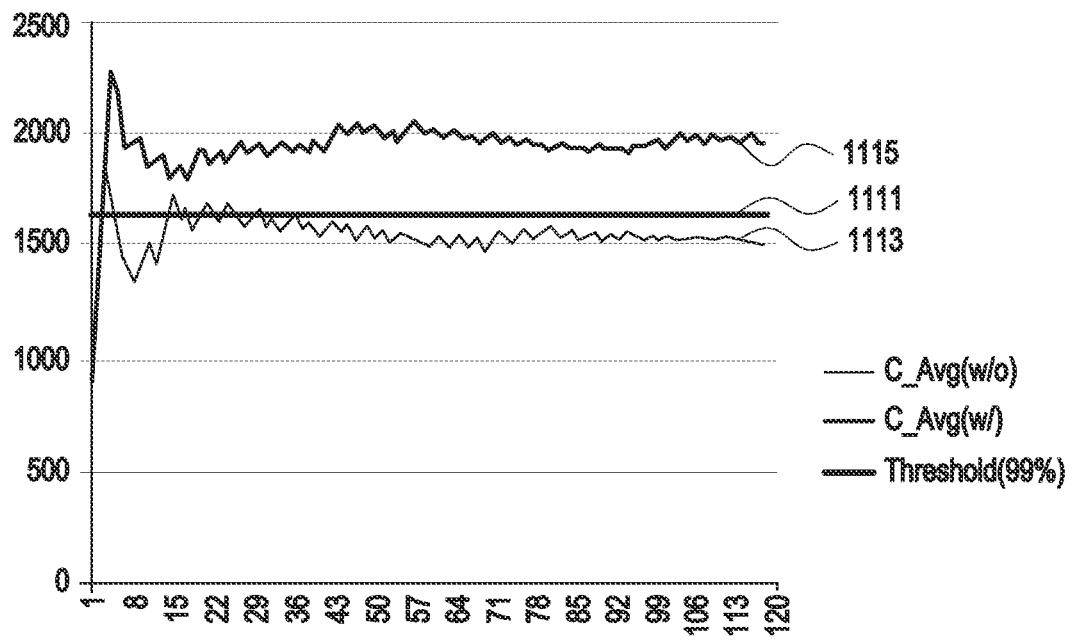
FIG. 11B illustrates a P-frame size and a threshold according to an embodiment of the disclosure.

FIG. 11B illustrates a P-frame size and a threshold according to an embodiment of the disclosure.

Figure 11C:
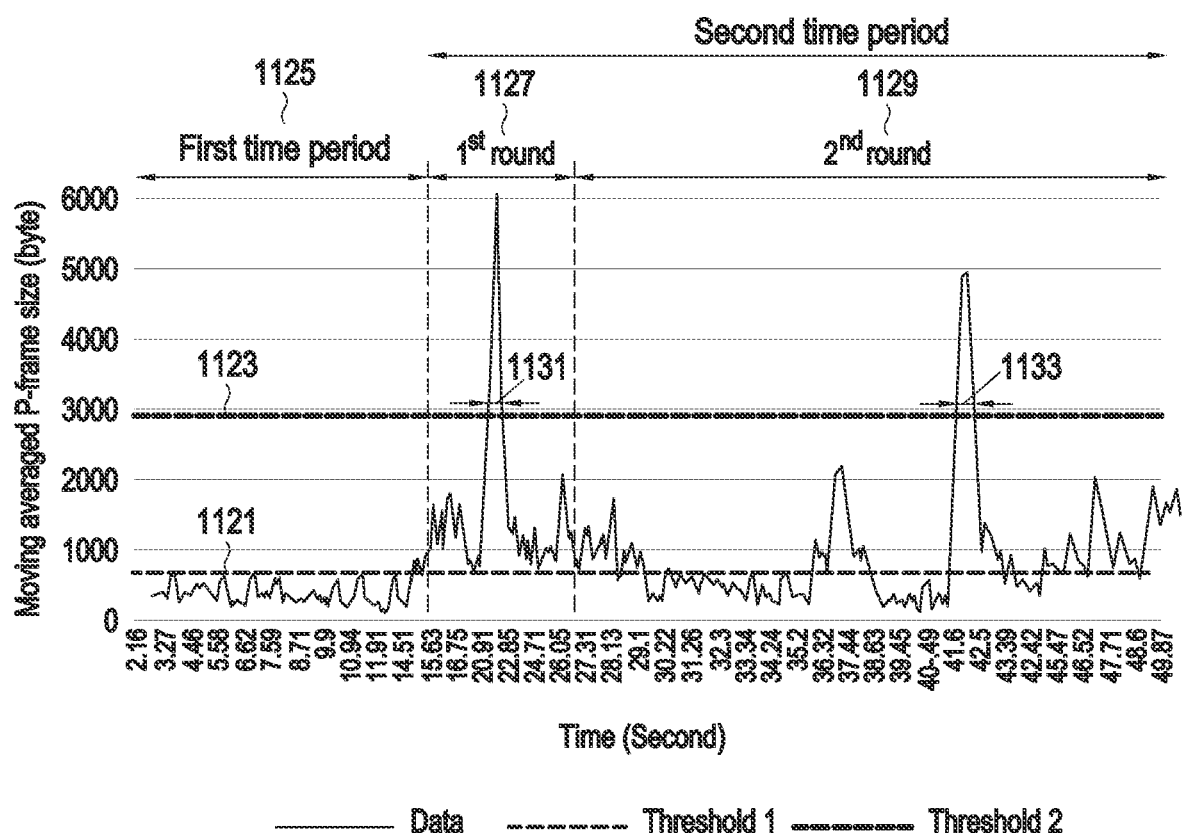
FIG. 11C is a view illustrating a method for setting a threshold according to an embodiment of the disclosure.

FIG. 11C is a view illustrating a method for setting a threshold according to an embodiment of the disclosure.

Referring to FIGS. 11A, 11B, and 11C, the electronic device 200 may identify the sizes of P-frames during a time the user stops. The electronic device 200 may calculate the distribution in which the identified P-frame sizes are a group. The electronic device 200 may calculate a standard normal distribution for the sizes of the P-frames by standardizing the normal distribution for the size distributions of the P-frames using the mean and standard deviation of P-frame sizes. For example, the standard normal distribution for the sizes of P-frames may be as shown in FIG. 11A. The electronic device 200 may calculate the value $Z(Z=(X-m)/\sigma)$ standardized by dividing the P-frame sizes X minus the mean m of P-frame sizes by the standard deviation σ of the P-frames. The electronic device 200 may calculate the probability that the P-frame size falls within a specific range using the standard normal distribution. Referring to FIG. 11A, the probability 1101 that the size of the P-frame falls within a range of $Z-1.96\sigma$ to $Z+1.96\sigma$ may be 95%. For example, as shown in FIG. 11A, the probability 1103 that the size of the P-frame falls within a range of $Z-2.33\sigma$ to $Z+2.33\sigma$ may be 98%. For example, as shown in FIG. 11A, the probability 1105 that the size of the P-frame falls within a range of $Z-2.58\sigma$ to $Z+2.58\sigma$ may be 99%. The electronic device 200 may set the upper bound $Z+2.58\sigma$ where the probability that the size of the P-frame falls within the specific range is 99% as the first threshold. Meanwhile, the first threshold may be any value for detecting motion without being limited to a specific one.

For example, in a case where the upper bound Z+2.58σ where the probability that the size of the P-frame falls within the specific range is 99% is set as the first threshold, when the number of P-frames where the frame size exceeds the first threshold exceeds a designated value, the electronic device 200 may determine that there is a motion. Referring to FIG. 11B, when there is no motion, the P-frame sizes 1113 mostly may have a value smaller than the first threshold 1111. For example, when there is a motion as shown in FIG. 11B, the P-frame sizes 1115 mostly may have a value larger than the first threshold 1111.

The electronic device 200 may calculate the standard normal distribution for the sizes of the P-frames exceeding the first threshold, using the mean and standard deviation of the P-frame sizes exceeding (or not less than) the first threshold. The electronic device 200 may set the bound Z+1.65σ where the probability that the P-frame size exceeding the first threshold falls within the specific range is 90% as a second threshold using the standard normal distribution for the P-frame sizes exceeding the first threshold. Meanwhile, the second threshold may be any value for detecting motion without being limited to a specific one. Referring to FIG. 11C, the sizes of most (e.g., 99.5%) of the P-frames in the first time period (e.g., time period during which the user does not move) 1125 may be smaller than the first threshold 1121. Further, the sizes of most (e.g., 95%) of the P-frames in the second time period (e.g., the time periods 1127 and 1129 during which the user moves) may be smaller than the second threshold 1123. The electronic device 200 may determine that the first external electronic device captures a moving object during the times 1131 and 1133 during which the P-frame having a size exceeding the second threshold is detected.

Figure 12A:
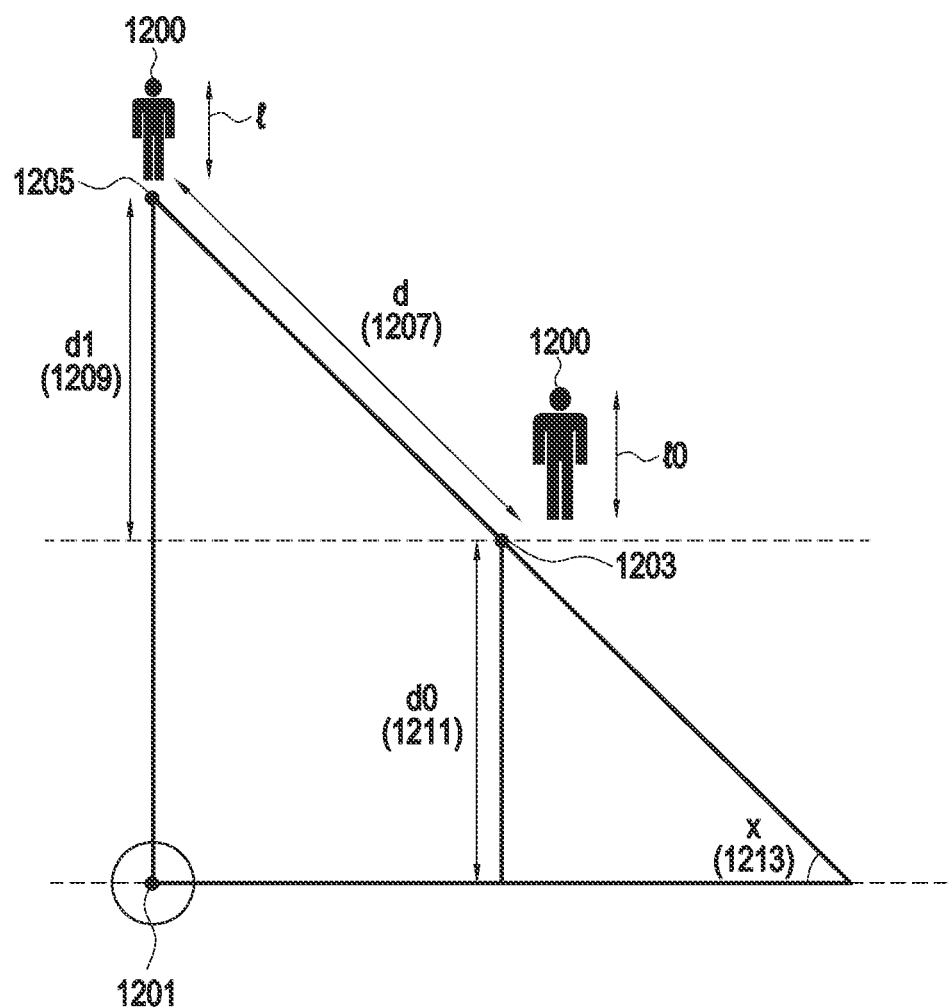
FIG. 12A is a view illustrating a method for identifying a user's motion according to an embodiment of the disclosure.

FIG. 12A is a view illustrating a method for identifying a user's motion according to an embodiment of the disclosure.

Figure 12B:
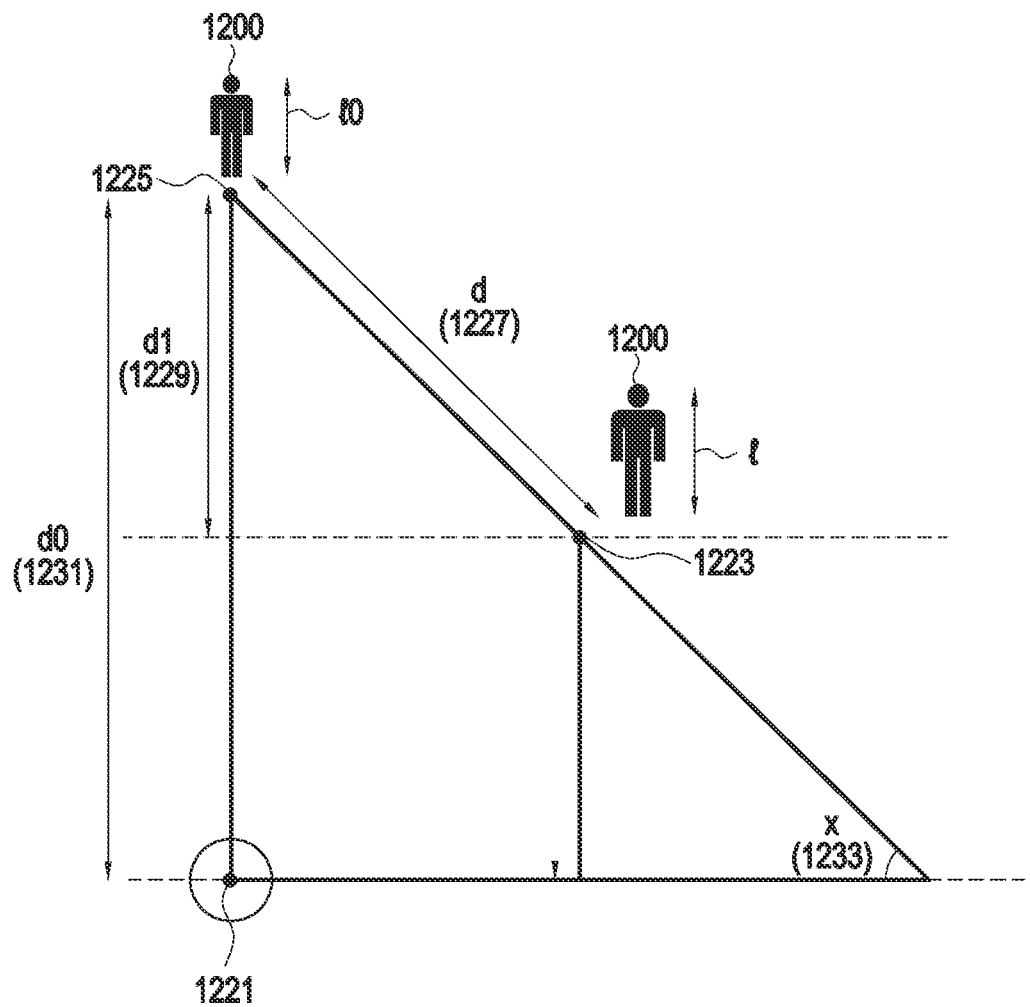
FIG. 12B is a view illustrating a method for identifying a user's motion according to an embodiment of the disclosure.

FIG. 12B is a view illustrating a method for identifying a user's motion according to an embodiment of the disclosure.

Figure 12C:
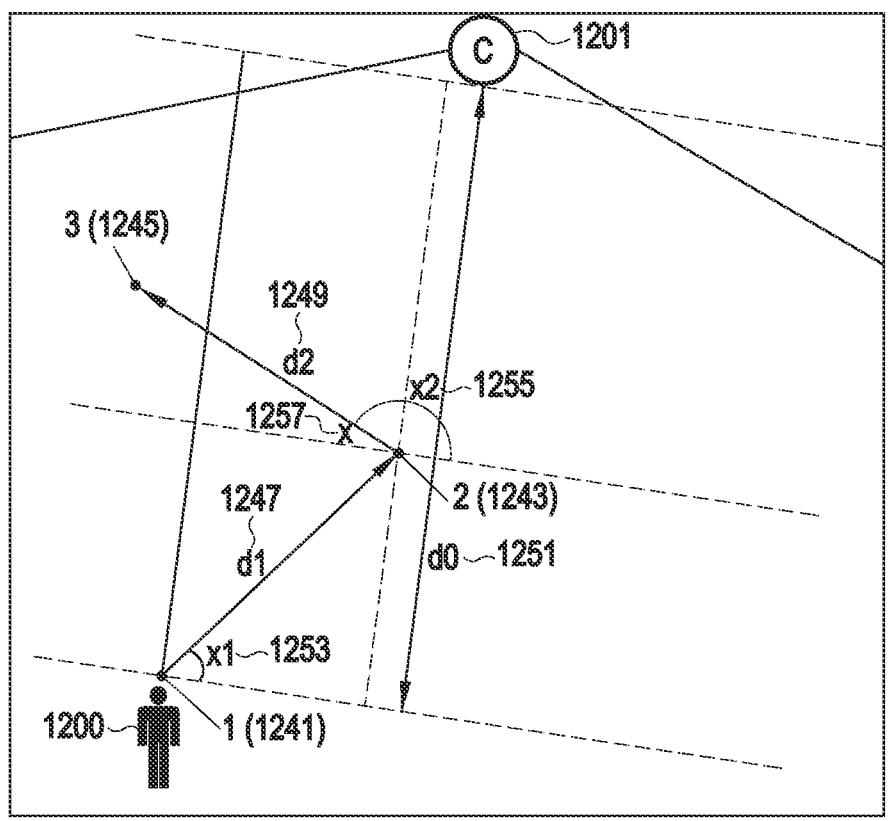
FIG. 12C is a view illustrating a method for identifying a user's motion according to an embodiment of the disclosure.

FIG. 12C is a view illustrating a method for identifying a user's motion according to an embodiment of the disclosure.

Referring to FIG. 12A, it may be assumed that the user 1200 who used to be at a first point 1203 away from the first external electronic device 1201 by a vertical distance of d0 1211 moves to a second point 1205 by d 1207 (i.e., moves away). Further, in the image captured by the first external electronic device 1201, the length of the object corresponding to the user 1200 may correspond to the vertical distance of the user 1200 and the first external electronic device 1201. Further, the size of the P-frame may be proportional to the square of the length of the object corresponding to the user 1200 in the image captured by the first external electronic device 1201.

The vertical distance between the first external electronic device 1201 and the user 1200 when the user is at the first point 1203 may be d0 1211, and the length of the object corresponding to the user 1200 in the image captured by the first external electronic device 1201 may be 10. When the user 1200 moves from the first point 1203 to the second point 1205, the user's actually moving distance may be d 1207 (user's moving speed s * user's moving time t), but the vertical distance from the first external electronic device may be varied by d1 1209. When the user 1200 is located at the second point 1205, the vertical distance between the first external electronic device 1201 and the user 1200 may be d0+d1. In this case, d1 may be calculated as d1=d* sin x, using the angle x 1213 for the direction in which the user has actually moved. Accordingly, when the user 1200 is located at the second point 1205, the length of the object corresponding to the user 1200 in the image captured by the first external electronic device 1201 may be $l=(d0/d0+d1)*10$. Accordingly, the P-frame size may be proportional to the square of $((d0*10)/(d0+s*t*\sin x))$. In this case, the user's moving speed s, the user's moving time t, and the angle x for the direction in which the user actually moves may be identified by the sensor included in the electronic device 200.

Referring to FIG. 12B, it may be assumed that the user 1200 who used to be at a first point 1225 away from the first external electronic device 1201 by a vertical distance of d0 1231 moves to a second point 1223 by d 1227 (i.e., moves closer). Further, in the image captured by the first external electronic device 1201, the length of the object corresponding to the user 1200 may correspond to the vertical distance of the user 1200 and the first external electronic device 1201. Further, the size of the P-frame may be proportional to the square of the length of the object corresponding to the user 1200 in the image captured by the first external electronic device 1201.

The vertical distance between the first external electronic device 1201 and the user 1200 when the user is at the first point 1225 may be d0 1231, and the length of the object corresponding to the user 1200 in the image captured by the first external electronic device 1201 may be 10. When the user 1200 moves from the first point 1225 to the second point 1223, the user's actually moving distance may be d 1227 (user's moving speed s * user's moving time t), but the vertical distance from the first external electronic device may be varied by d1 1229. When the user 1200 is located at the second point 1223, the vertical distance between the first external electronic device 1201 and the user 1200 may be d0-d1. In this case, d1 may be calculated as d1=d* sin x, using the angle x 1233 for the direction in which the user has actually moved. Accordingly, when the user 1200 is located at the second point 1223, the length of the object corresponding to the user 1200 in the image captured by the first external electronic device 1201 may be $l=(d0/d0-d1)*10$. Accordingly, the P-frame size may be proportional to the square of $((d0*10)/(d0-s*t*\sin x))$. Accordingly, when the user 1200 moves closer to the first external electronic device 1200, the ratio of P-frame size between before and after the motion is the value obtained by dividing the current P-frame size by the previous P-frame size, and may thus be calculated as $((d0*10)/(d0-d*\sin x))^2/((d0*10)/(d0))^2 = d0^2/(d0-d*\sin x)^2$.

Referring to FIG. 12C, it may be assumed that the user who used to be at a first point 1241 away from the first external electronic device 1201 by a vertical distance of d0 1251 moves to the second point 1243 and moves from the second point 1243 to a third point 1245. When the user 1200 moves from the first point 1241 to the second point 1243, the slope, which is the change rate of P-frame size may be calculated as $a = d0^2/(d0-d1*\sin x1)^2$. In this case, d0 1251 may be the vertical distance between the first point 1241 and the first external electronic device 1201, d1 1247 may mean the distance between the first point 1241 and the second point 1243, and x1 1253 may mean the direction moving from the first point 1241 to the second point 1243. When the user 1200 moves from the second point 1243 to the third point 1245, the slope, which is the change rate of P-frame size may be calculated as $b = (d1*\sin x1)^2/(d1*\sin x1 - d2*\sin x2)^2$. In this case, d2 1249 may mean the distance between the second point 1243 and the third point 1245, and x2 1255 may mean the direction moving from the second point 1243 to the third point 1245. The absolute value of x2 minus x1 may be equal to 180 minus the absolute value of x. Accordingly, d0, x1, and x2 may be calculated based on the calculated a, b, x, d1, and d2 values. For example, the three variables d0, x1, and x2 may be calculated using the absolute value=180 of the value obtained by subtracting (Equation 1) a=d0^2/(d0-d1*sin x1)^2, (Equation 2) b=(d1*sin x1)^2/(d1*sin x1-d2*sin x2)^2, and (Equation 3) x2-x1, minus the absolute value of x. The electronic device 200 may identify information about the direction where the first external electronic device 1201 is located and the vertical distance from the first external electronic device with respect to the first point 1241, based on d0, x1, and x2. For example, the electronic device 200 may identify the direction of the first external electronic device with respect to a reference direction in which the user faces, using the calculated x2 and x1 values. Since d0 may mean the straight-line distance from the first point 1241 where the user has initially been located to the first external electronic device 1201, the electronic device 200 may estimate the information about the distance based on d0.

Figures 13A, 13B:
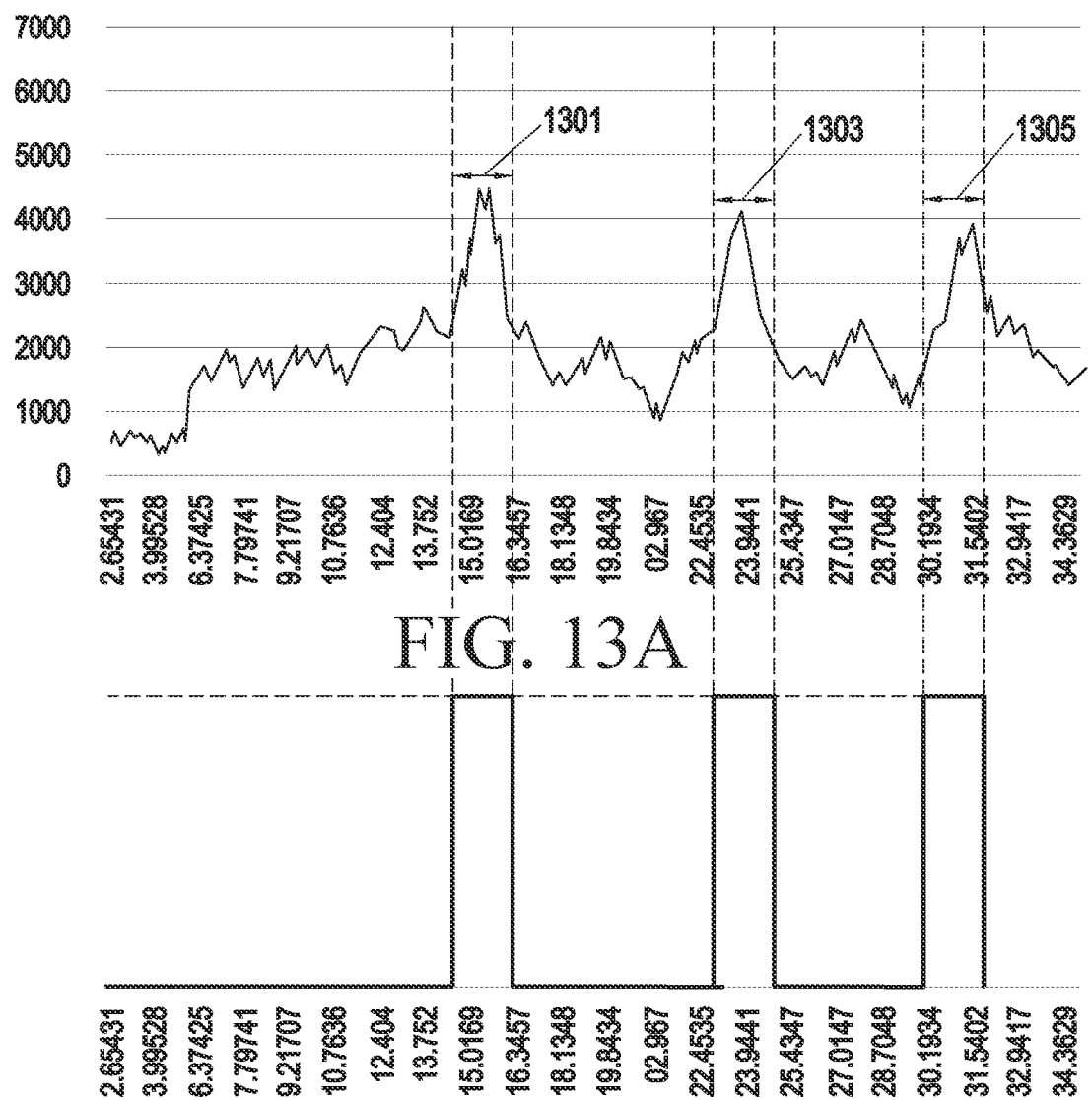
FIGS. 13A and 13B are views illustrating a method for using a P-frame pattern and a motion vector according to an embodiment of the disclosure.

FIGS. 13A and 13B are views illustrating a method for using a P-frame pattern and a motion vector according to an embodiment of the disclosure.

Referring to FIGS. 13A and 13B, according to various embodiments of the disclosure, the electronic device 200 may identify information about the time period during which the user moves based on the P-frame pattern. The electronic device 200 may identify the user's motion vector based on the data detected by the sensor. The electronic device 200 may determine whether the first external electronic device is a device capturing the user based on whether the time period during which the user moves corresponds to the user's motion vector. For example, as shown in FIG. 13A, the electronic device 200 may determine that the user's motion is captured at a first time 1301, a second time 1303, and a third time 1305 based on the P-frame pattern. For example, as shown in FIG. 13B, the electronic device 200 may detect motion at the first time 1301, the second time 1303, and the third time 1305. Upon detecting a motion through a sensor during the time when the user's motion is captured based on the P-frame pattern as shown in FIGS. 13A and 13B, the electronic device 200 may determine that the first external electronic device captures the user. Meanwhile, although identifying that the user's motion is captured based on the P-frame pattern, if no motion is detected through the sensor, the electronic device 200 may determine that it is not a device capturing the user.

Figure 14A:
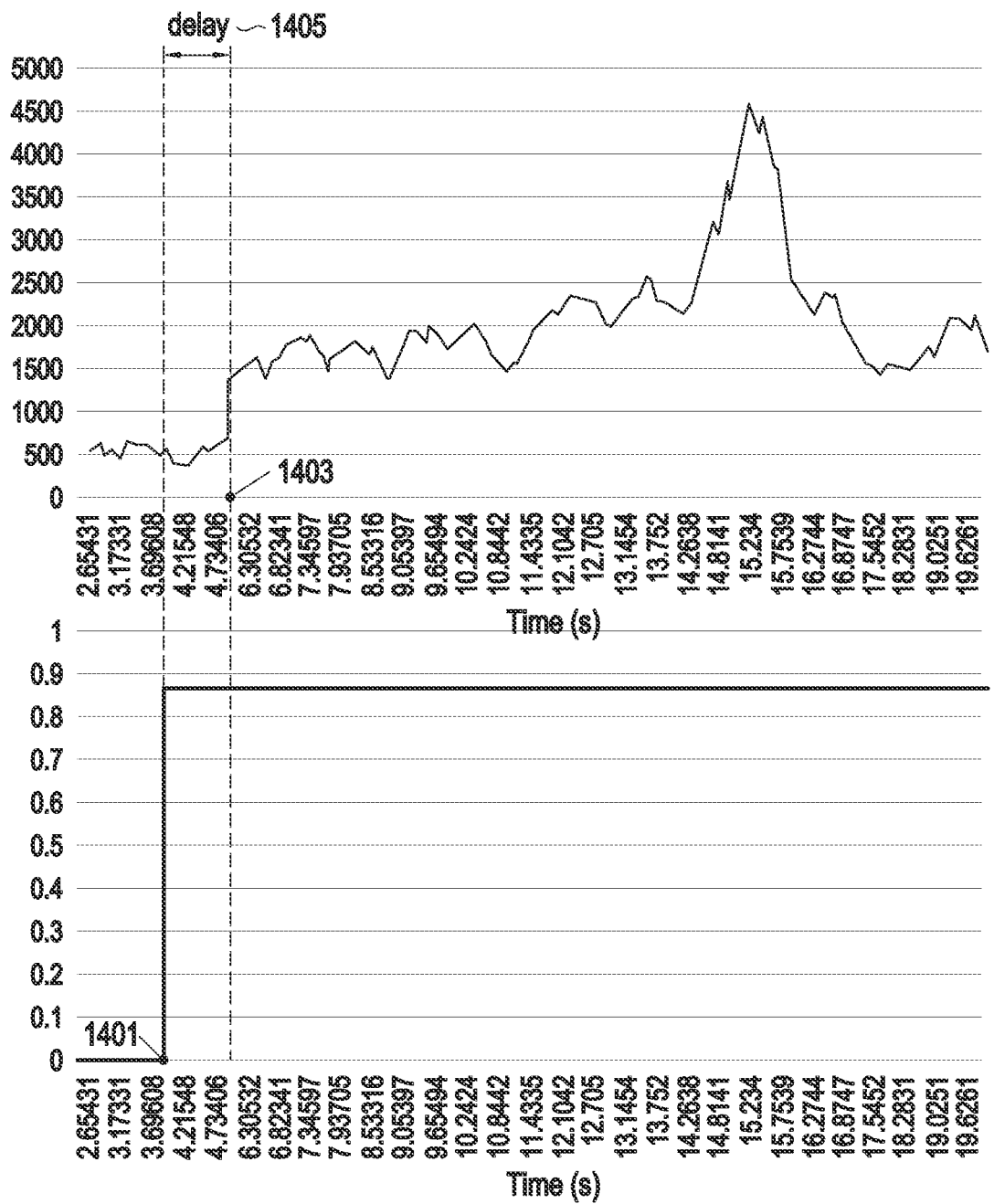
FIG. 14A is a view illustrating a method for using a P-frame pattern and a motion vector according to an embodiment of the disclosure.

FIG. 14A is a view illustrating a method for using a P-frame pattern and a motion vector according to an embodiment of the disclosure.

According to various embodiments of the disclosure, a delay may occur while the first external electronic device 200 uploads the image captured for the user. Referring to FIG. 14A, a delay 1405 may occur between the time 1401 when the electronic device 200 detects a motion through a sensor and the time 1403 when it is determined that a motion is captured based on the P-frame pattern. When the difference between the time when it is determined that a motion is captured based on the P-frame pattern and the time when a motion is detected through the sensing data is a designated time or less, the electronic device 200 may determine that the P-frame pattern and the motion detection period correspond to each other. Further, to reduce an error caused by the delay in determining the position of the first external electronic device, the electronic device 200 may indicate a moving path to the user.

Figure 14B:
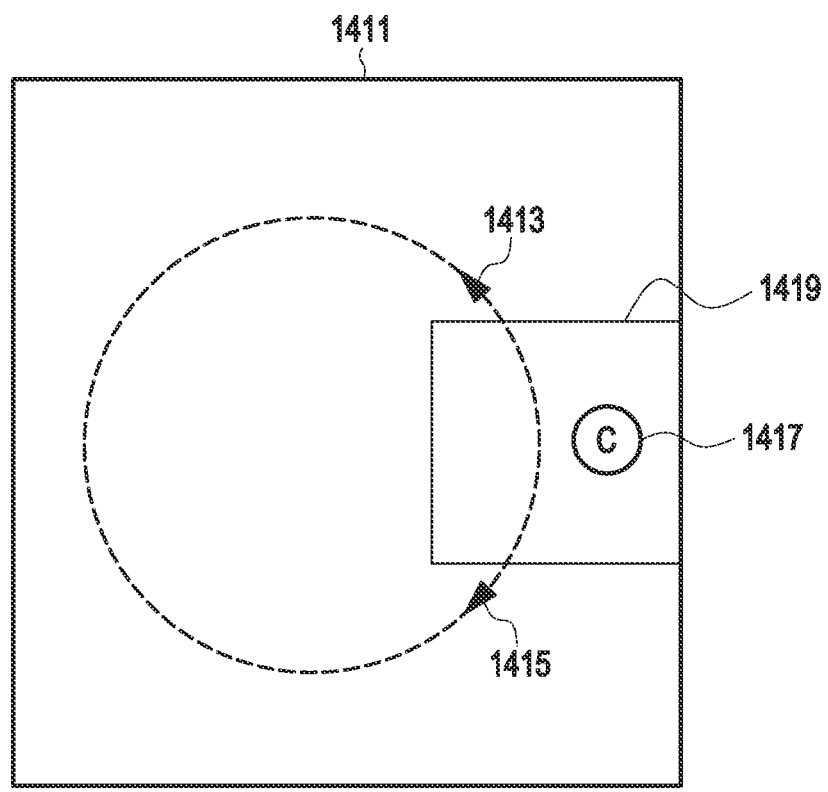
FIG. 14B is a view illustrating a method for indicating a moving path according to an embodiment of the disclosure.

FIG. 14B is a view illustrating a method for indicating a moving path according to an embodiment of the disclosure.

Referring to FIG. 14B, the electronic device 200 may direct the user to the moving path 1413 to move around, at least once, the space 1411 in which the user is located. In this case, the electronic device 200 may identify the moving speed of the user and/or the time when the user passes through the position included in the capture area 1419 of the first external electronic device 1419 based on the sensing data obtained through the sensor. The time when it is determined that a motion is captured based on the P-frame pattern may be later than the time identified based on the sensing data, due to delay. The electronic device 200 may direct the user to a moving path 1415 to move around, at least once, the space 1411 where the user is located, in the direction opposite to the previously directed moving path. The electronic device 200 may determine the position of the first external electronic device 1417 based on the delay time and the user's walking speed calculated based on the sensing data obtained through the sensor.

Figure 15A:
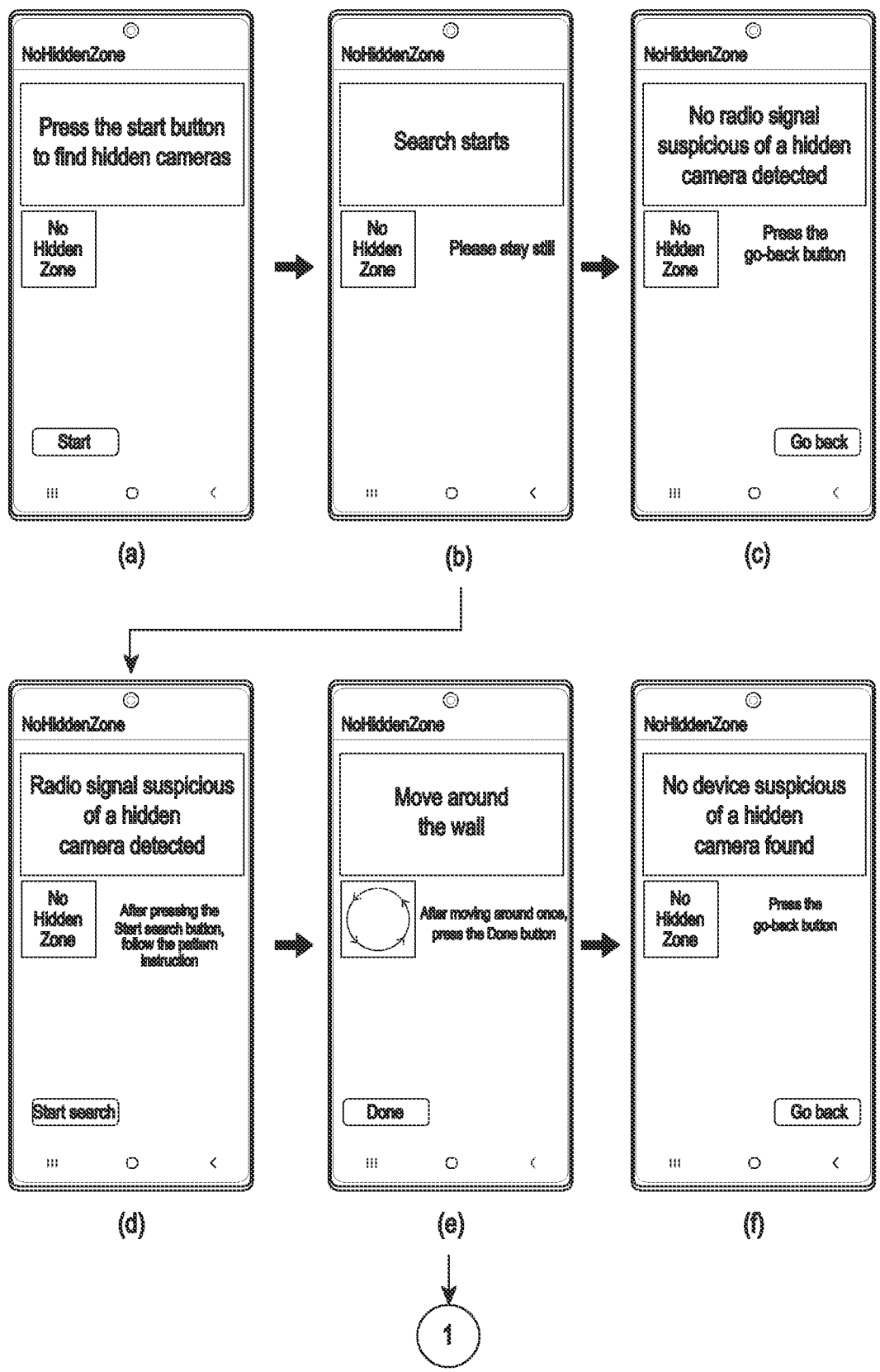
FIG. 15A is a view illustrating an operation method of an electronic device according to an embodiment of the disclosure.
Figure 15B:
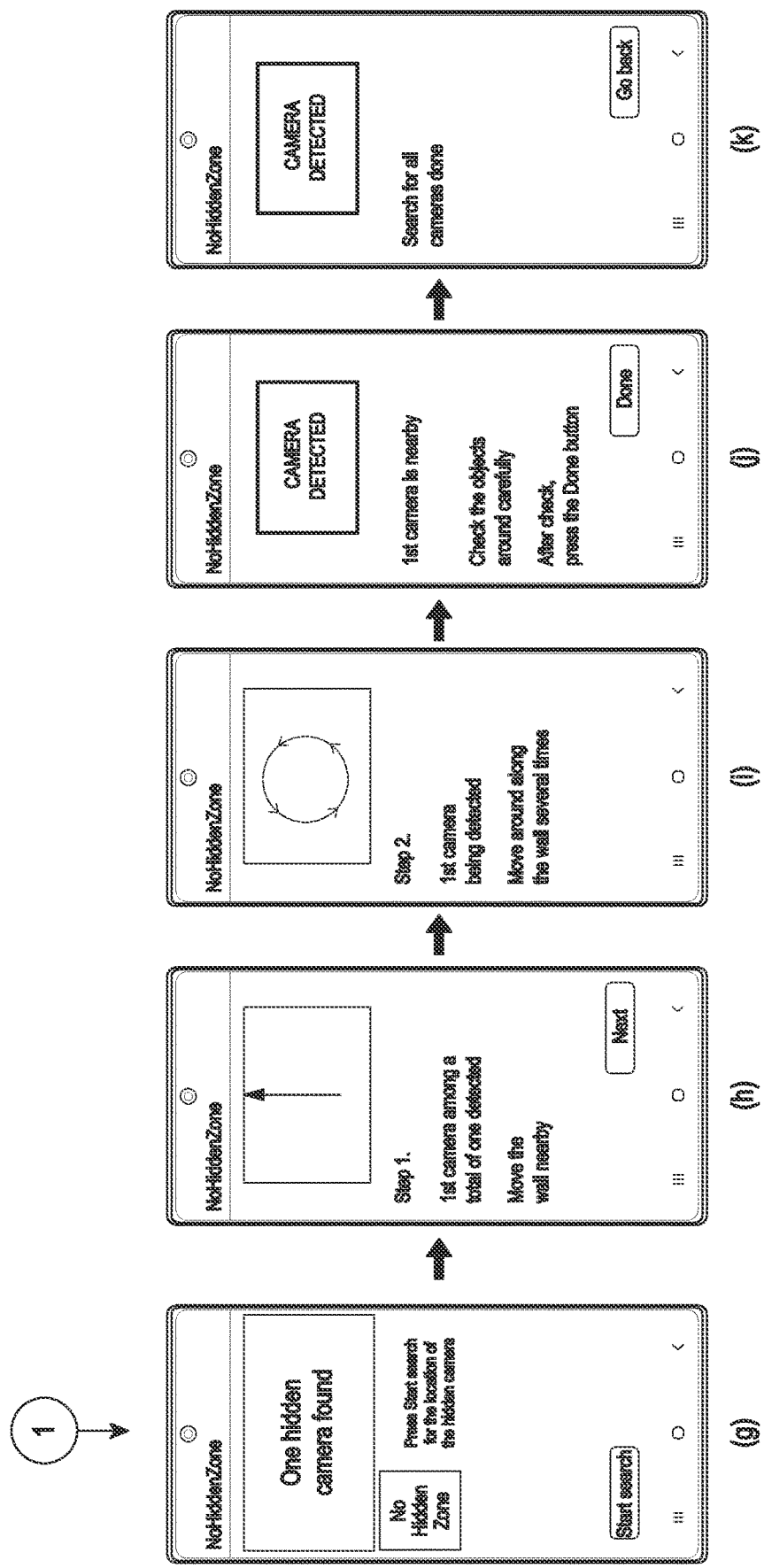
FIG. 15B is a view illustrating an operation method of an electronic device according to an embodiment of the disclosure.

FIGS. 15A and 15B are views illustrating an operation method of an electronic device according to various embodiments of the disclosure. Upon receiving a user input to execute an application, the electronic device 200 may display a screen for starting the operation of detecting the position of the camera.

Referring to part (a) of FIG. 15A, the electronic device 200 may display a notification, such as "Press the start button to find hidden cameras". If the user input to start the operation for detecting the position of the camera is received, the electronic device 200 may provide a guide to maintain the static state during the first time period. For example, as shown in part (a) of FIG. 15A, the electronic device 200 may display a notification, such as "Detection starts. Please stay still." The electronic device 200 may identify packet information about external electronic devices transmitting/receiving packets to/from the wireless router during the first time period. The electronic device 200 may identify whether there is an external electronic device determined to be a capture device based on the packet information. When there is no external electronic device determined to be a capture device, the electronic device 200 may indicate that there is no capture device. For example, as shown in part (c) of FIG. 15A, the electronic device 200 may display a notification, such as "No radio signal as suspicious of a hidden camera is detected." When there is an external electronic device determined to be a capture device, the electronic device 200 may indicate that there is a capture device and guides to a moving path. For example, as shown in part (d) of FIG. 15A, the electronic device 200 may display a notification, such as "A radio signal suspicious of a hidden camera is detected." For example, as shown in part (e) of FIG. 15A, the electronic device 200 may display a notification, such as "Walk around along the wall." During the second time period when the user moves, the electronic device 200 may identify the P-frame pattern based on the packet information associated with the first external electronic device suspicious of a capture device. Further, during the second time period, the electronic device 200 may identify the motion vector based on the sensing data obtained through the sensor. The electronic device 200 may determine whether the first external electronic device is a capture device capturing the user based on whether the P-frame pattern corresponds to the motion vector. Upon determining that the first external electronic device is not a capture device capturing the user, the electronic device 200 may indicate that there is no capture device.

Referring to part (f) of FIG. 15A, the electronic device 200 may display a notification, such as "No device suspicious of a hidden camera found." Upon determining that there is a capture device capturing the user, the electronic device 200 may indicate that there is a capture device and reindicates a moving path. Referring to part (g) of FIG. 15B, the electronic device 200 may display a notification, such as "One hidden camera found." For example, as shown in part (h) of FIG. 15B, the electronic device 200 may display a notification, such as "Move to a wall nearby." Referring to part (i) of FIG. 15B, the electronic device 200 may display a notification, such as "Move around along the wall several times." The electronic device 200 may determine that as the change in P-frame size increases, the first external electronic device is capturing in a closer position. The electronic device 200 may determine the position of the first external electronic device based on the P-frame pattern. For example, the electronic device 200 may determine the position of the first external electronic device based on the P-frame pattern obtained during motion and, if the distance between the position of the electronic device 200 and the position of the first external electronic device is less than a preset distance, display a notification, such as "The first camera is nearby. Please check the objects around carefully. After check, press the done button", as shown in part (j) of FIG. 15B. The electronic device 200 may terminate the application according to a user input to select Done. Referring to part (k) of FIG. 15B, the electronic device 200 may display a notification, such as "Search for cameras is done." and terminate the application.

According to various embodiments of the disclosure, an electronic device (e.g., the electronic device 200) may comprise a display (e.g., the display 240), a communication circuit (e.g., the communication circuit 220), at least one sensor (e.g., the sensor 230), and at least one processor (e.g., the processor 210). The at least one processor (e.g., the processor 210) may be configured to identify data packet information associated with at least one external electronic device, through the communication circuit, identify a first external electronic device (e.g., the first external electronic device 120) among the at least one external electronic device, based on the data packet information, obtain a P-frame pattern during a first time period and a P-frame or RSSI pattern during a second time period, based on information associated with a packet size of the first external electronic device among the data packet information, identify a motion vector during the second time period through the at least one sensor (e.g., the sensor 230), and provide location information about the first external electronic device (e.g., the first external electronic device 120), based on the P-frame or RSSI pattern during the second time period and the motion vector during the second time period.

According to various embodiments of the disclosure, the at least one processor (e.g., the processor 210) may be configured to identify whether there is an electronic device (e.g., the first external electronic device 120) performing live streaming among the at least one external electronic device, based on the data packet information.

According to various embodiments of the disclosure, the at least one processor (e.g., the processor 210) may be configured to identify a set of a plurality of packets corresponding to one frame, based on the information associated with the packet size of the first external electronic device (e.g., the first external electronic device 120).

According to various embodiments of the disclosure, the at least one processor (e.g., the processor 210) may be configured to identify whether the one frame is a P-frame based on a size of the set of the plurality of packets.

According to various embodiments of the disclosure, the at least one processor (e.g., the processor 210) may be configured to identify a set of a plurality of packets corresponding to one frame, based on a time interval when a plurality of packets transmitted/received by the first external electronic device (e.g., the first external electronic device 120) are transmitted/received.

According to various embodiments of the disclosure, the at least one processor (e.g., the processor 210) may be configured to identify that the first external electronic device (e.g., the first external electronic device 120) is a capture device capturing a space where the electronic device (e.g., the electronic device 200) is located, based on the P-frame pattern during the first time period and the P-frame or RSSI pattern during the second time period.

According to various embodiments of the disclosure, the at least one processor (e.g., the processor 210) may be configured to display a screen to indicate a user's moving path during the second time period, through the display (e.g., the display 240).

According to various embodiments of the disclosure, the P-frame or RSSI pattern may indicate a size of a P-frame or RSSIs according to time.

According to various embodiments of the disclosure, location information about the first external electronic device (e.g., the first external electronic device 120) may include information about a distance between the electronic device (e.g., the electronic device 200) and the first external electronic device (e.g., the first external electronic device 120) and information about a direction in which the first external electronic device (e.g., the first external electronic device 120) is located.

According to various embodiments of the disclosure, the at least one processor (e.g., the processor 210) may be configured to, if the P-frame or RSSI pattern during the second time period meets a designated condition during at least a partial time of the second time period, identify a user's moving path during the at least the partial time.

According to various embodiments of the disclosure, a method for operating an electronic device (e.g., the electronic device 200) may comprise identifying data packet information associated with at least one external electronic device, identifying a first external electronic device (e.g., the first external electronic device 120) among the at least one external electronic device, based on the data packet information, obtaining a P-frame pattern during a first time period and a P-frame or RSSI pattern during a second time period, based on information associated with a packet size of the first external electronic device (e.g., the first external electronic device 120) among the data packet information, identifying a motion vector during the second time period, and providing location information about the first external electronic device (e.g., the first external electronic device 120), based on the P-frame or RSSI pattern during the second time period and the motion vector during the second time period.

According to various embodiments of the disclosure, identifying the first external electronic device (e.g., the electronic device 200) may include identifying whether there is an electronic device (e.g., the first external electronic device 120) performing live streaming among the at least one external electronic device, based on the data packet information.

According to various embodiments of the disclosure, obtaining the P-frame pattern during the first time period and the P-frame pattern during the second time period may include identifying a set of a plurality of packets corresponding to one frame, based on the information associated with the packet size of the first external electronic device (e.g., the first external electronic device 120).

According to various embodiments of the disclosure, obtaining the P-frame pattern during the first time period and the P-frame pattern during the second time period may further include identifying whether the one frame is a P-frame based on a size of the set of the plurality of packets corresponding to the one frame.

According to various embodiments of the disclosure, obtaining the P-frame pattern during the first time period and the P-frame pattern during the second time period may include identifying a set of a plurality of packets corresponding to one frame, based on a time interval when a plurality of packets transmitted/received by the first external electronic device (e.g., the first external electronic device 120) are transmitted/received.

According to various embodiments of the disclosure, the method may further comprise identifying that the first external electronic device (e.g., the first external electronic device 120) is a capture device capturing a space where the electronic device (e.g., the electronic device 200) is located, based on the P-frame pattern during the first time period and the P-frame or RSSI pattern during the second time period.

According to various embodiments of the disclosure, the method may further comprise displaying a screen indicating a user's moving line during the second time period.

According to various embodiments of the disclosure, the P-frame or RSSI pattern may indicate a size of a P-frame or RSSIs according to time.

According to various embodiments of the disclosure, location information about the first external electronic device (e.g., the first external electronic device 120) may include information about a distance between the electronic device (e.g., the electronic device 200) and the first external electronic device (e.g., the first external electronic device 120) and information about a direction in which the first external electronic device (e.g., the first external electronic device 120) is located.

According to various embodiments of the disclosure, providing the location information about the first external electronic device (e.g., the electronic device 200) may include, if the P-frame or RSSI pattern during the second time period meets a designated condition during at least a partial time of the second time period, identifying a user's moving path during the at least the partial time.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)), or be distributed (e.g., downloaded or uploaded) online via an application store (e.g., Play Store), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. Some of the plurality of entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a display;
    communication circuitry;
    at least one sensor;
    memory, comprising one or more storage media, storing instructions; and
    at least one processor communicatively coupled to the memory, the at least one sensor, the communication circuitry, and the display,
    wherein the instructions, when executed by the at least one processor, cause the electronic device to:
        receive signals including data packet information through the communication circuitry,
        identify the data packet information associated with at least one external electronic device,
        identify a first external electronic device among the at least one external electronic device, based on the data packet information,
        obtain a predicted frame (P-frame) pattern during a first time period, and obtain a second P-frame pattern during a second time period based on information associated with packet sizes of the first external electronic device among the data packet information or a received signal strength indication (RSSI) pattern during the second time period based on RSSI values of the received signal,
        identify a motion vector corresponding to a distance and a direction of a movement of the electronic device during the second time period through the at least one sensor,
        determine location information about the first external electronic device, based on the motion vector during the second time period and either a change in frame sizes of the second P-frame pattern during the second time period or a change in the RSSI values of the RSSI pattern during the second time period, and
        provide the location information about the first external electronic device.

2. The electronic device of claim 1, wherein the instructions, when executed by the at least one processor, further cause the electronic device to identify whether there is an electronic device performing live streaming among the at least one external electronic device, based on the data packet information.

3. The electronic device of claim 1, wherein the instructions, when executed by the at least one processor, further cause the electronic device to identify a set of a plurality of packets corresponding to one frame, based on the information associated with the packet sizes of the first external electronic device.

4. The electronic device of claim 3, wherein the instructions, when executed by the at least one processor, further cause the electronic device to identify whether the one frame is a P-frame based on a size of the set of the plurality of packets corresponding to the one frame.

5. The electronic device of claim 1, wherein the instructions, when executed by the at least one processor, further cause the electronic device to identify a set of a plurality of packets corresponding to one frame, based on a time interval of the plurality of packets transmitted to or received by the first external electronic device.

6. The electronic device of claim 1, wherein the instructions, when executed by the at least one processor, further cause the electronic device to identify that the first external electronic device is a capture device capturing a space where the electronic device is located, based on the P-frame pattern during the first time period and the second P-frame pattern or the RSSI pattern during the second time period.

7. The electronic device of claim 1, wherein the instructions, when executed by the at least one processor, further cause the electronic device to display a screen to indicate a user's moving path during the second time period, through the display.

8. The electronic device of claim 1, wherein location information about the first external electronic device includes:
    information about a distance between the electronic device and the first external electronic device; and
    information about a direction in which the first external electronic device is located.

9. A method performed by an electronic device, the method comprising:
    receiving signals including data packet information through communication circuitry of the electronic device;
    identifying the data packet information associated with at least one external electronic device;
    identifying a first external electronic device among the at least one external electronic device, based on the data packet information;
    obtaining a predicted frame (P-frame) pattern during a first time period, and obtaining a second P-frame pattern during a second time period based on information associated with packet sizes of the first external electronic device among the data packet information or a received signal strength indication (RSSI) pattern during the second time period based on RSSI values of the received signals
    identifying a motion vector corresponding to a distance and a direction of a movement of the electronic device during the second time period through at least one sensor of the electronic device;
    determining location information about the first external electronic device, based on the motion vector during the second time period and either a change in frame sizes of the second P-frame pattern during the second time period or a change in the RSSI values of the RSSI pattern during the second time period; and
    providing the location information about the first external electronic device.

10. The method of claim 9, wherein the identifying of the first external electronic device includes identifying whether there is an electronic device performing live streaming among the at least one external electronic device, based on the data packet information.

11. The method of claim 9, wherein the obtaining of the P-frame pattern during the first time period and the second P-frame pattern during the second time period includes identifying a set of a plurality of packets corresponding to one frame, based on the information associated with the packet sizes of the first external electronic device.

12. The method of claim 11, wherein the obtaining of the P-frame pattern during the first time period and the second P-frame pattern during the second time period further includes identifying whether the one frame is a P-frame based on a size of the set of the plurality of packets corresponding to the one frame.

13. The method of claim 9, wherein the obtaining of the P-frame pattern during the first time period and the second P-frame pattern during the second time period includes identifying a set of a plurality of packets corresponding to one frame, based on a time interval of a plurality of packets transmitted/received transmitted or received by the first external electronic device, being transmitted/received.

14. The method of claim 9, wherein the identifying of the first external electronic device includes identifying that the first external electronic device is a capture device capturing a space where the electronic device is located, based on the P-frame pattern during the first time period and the second P- frame pattern or the RSSI pattern during the second time period.

15. The method of claim 9, further comprising:
displaying a screen to indicate a user's moving path during the second time period, through the display.

16. The method of claim 9, wherein the P-frame is a forward prediction frame that predicts and stores only partial data that differs from an intra frame (I-frame) positioned immediately prior to the P-frame.

17. The method of claim 16, wherein when a user moves in a horizontal direction from a first distance close to the first external electronic device, a variation in P-frame size may be larger than when the user moves in the horizontal direction from a second distance far from the first external electronic device.

18. A non-transitory storage medium storing a program including executable instructions which when executed by at least one processor of an electronic device, cause the electronic device to perform:

receiving signals including data packet information through communication circuitry of the electronic device;

identifying the data packet information associated with at least one external electronic device;

identifying a first external electronic device among the at least one external electronic device, based on the data packet information;

obtaining a predicted frame (P-frame) pattern during a first time period, and obtaining a second P-frame pattern during a second time period based on information associated with packet sizes of the first external electronic device among the data packet information or a received signal strength indication (RSSI) pattern during the second time period based on RSSI values of the received signals;

identifying a motion vector corresponding to a distance and a direction of a movement of the electronic device during the second time period through at least one sensor of the electronic device;

determining location information about the first external electronic device, based on the motion vector during the second time period and either a change in frame sizes of the second P-frame pattern during the second time period or a change in the RSSI values of the RSSI pattern during the second time period; and providing the location information about the first external electronic device.

* * * * *